US012600459B1

(12) United States Patent
Wang et al.

(10) Patent No.: US 12,600,459 B1
(45) Date of Patent: Apr. 14, 2026

(54) BLADE MANUFACTURING FOR VERTICAL TAKE-OFF DUAL-ENGINE AIRCRAFT

(71) Applicant: Anduril Industries, Inc., Costa Mesa, CA (US)

(72) Inventors: Zhe Kevin Wang, Costa Mesa, CA (US); Jessica Rader, San Diego, CA (US)

(73) Assignee: Anduril Industries, Inc., Costa Mesa, CA (US)

( * ) Notice: Subject to any disclaimer, the term of this patent is extended or adjusted under 35 U.S.C. 154(b) by 60 days.

(21) Appl. No.: 18/646,398

(22) Filed: Apr. 25, 2024

(51) Int. Cl.
　　*B64C 11/00* 　　(2006.01)
　　*B64C 11/26* 　　(2006.01)
　　*B64C 27/473* 　　(2006.01)

(52) U.S. Cl.
　　CPC ............ *B64C 11/008* (2013.01); *B64C 11/26* (2013.01); *B64C 2027/4736* (2013.01)

(58) Field of Classification Search
　　CPC ....... B64C 27/48; B64C 11/008; B64C 11/20; B64C 11/26; B64C 2027/4733; B64C 2027/4736; B64C 27/473; B29L 2031/08; B29L 2031/082; B29L 2031/087; B29L 2031/3088; F01D 5/027; F04D 29/662
　　See application file for complete search history.

(56) References Cited

U.S. PATENT DOCUMENTS 3,237,697 A * 3/1966 Ford .................. B29D 99/0028
　　　　　　　　　　　　　　　　　　416/241 A
3,321,019 A * 5/1967 Dmitroff ................. B64C 27/48
　　　　　　　　　　　　　　　　　　416/241 A 3,713,753 A * 1/1973 Brunsch ................ B29C 70/545
　　　　　　　　　　　　　　　　　　416/241 A
3,810,713 A * 5/1974 Joiner ..................... B64C 27/48
　　　　　　　　　　　　　　　　　　261/DIG. 65
4,083,656 A * 4/1978 Braswell ............ B29D 99/0025
　　　　　　　　　　　　　　　　　　428/116
4,260,332 A * 4/1981 Weingart .............. F03D 1/0658
　　　　　　　　　　　　　　　　　　416/226
4,302,155 A * 11/1981 Grimes ................... B64C 11/26
　　　　　　　　　　　　　　　　　　416/241 A (Continued)

FOREIGN PATENT DOCUMENTS

CN　　112429201 A * 3/2021 ............ B64C 11/20
CN　　112550691 A * 3/2021 ........... B64C 27/473
(Continued)

*Primary Examiner* — Topaz L. Elliott
(74) *Attorney, Agent, or Firm* — Knobbe, Martens, Olson & Bear, LLP

(57) ABSTRACT

A rotor system for an aircraft that includes one or more rotor blades respectively connected to the rotor via a blade cuff, and a method of manufacturing the rotor system is disclosed. The rotor system includes (i) a blade cuff coupled to a blade, wherein a distal end diameter of the blade cuff is larger in diameter than a middle portion diameter of the blade cuff, and (ii) a blade. The blade is wrapped in a plurality of fibers. At least a subset of the plurality of fibers extend longitudinally down the blade from wrapping the middle portion diameter of the blade cuff and continuing past the distal end diameter of the blade cuff. The blade comprises a plurality of weights disposed in a forward edge section of the blade to balance a front side of the blade and a backside of the blade.

20 Claims, 29 Drawing Sheets

(56) References Cited

U.S. PATENT DOCUMENTS

| | | | | |
|---|---|---|---|---|
| 4,762,466 A * | 8/1988 | Bouiller | F01D 5/02 | 416/205 |
| 5,222,297 A * | 6/1993 | Graff | B29C 70/865 | 29/889.7 |
| 5,462,409 A * | 10/1995 | Frengley | B29C 70/302 | 416/144 |
| 6,443,701 B1 * | 9/2002 | Muhlbauer | F04D 29/36 | 416/248 |
| 2002/0164251 A1 * | 11/2002 | Sehgal | B64C 27/473 | 29/889.71 |
| 2010/0162565 A1 * | 7/2010 | Mukherji | B26F 3/004 | 83/53 |
| 2011/0129341 A1 * | 6/2011 | Seitz | F16F 15/366 | 416/1 |
| 2013/0142658 A1 * | 6/2013 | Bianchi | F01D 5/147 | 416/226 |
| 2015/0064013 A1 * | 3/2015 | Measom | B64C 3/20 | 29/889.71 |
| 2015/0233249 A1 * | 8/2015 | Nagle | B29D 99/0025 | 29/889.7 |
| 2018/0273163 A1 * | 9/2018 | Sutton | B64C 27/001 | |
| 2023/0286643 A1 * | 9/2023 | Joudon | F01D 7/00 | |
| 2024/0262519 A1 * | 8/2024 | Toland | B64U 80/50 | |

FOREIGN PATENT DOCUMENTS

| | | | | |
|---|---|---|---|---|
| CN | 113104210 A * | 7/2021 | B29D 99/0025 |
| CN | 117485529 A * | 2/2024 | B63H 1/26 |
| CN | 117698992 A * | 3/2024 | |
| CN | 117755488 A * | 3/2024 | |
| FR | 2554077 A1 * | 5/1985 | |
| FR | 3045714 A1 * | 6/2017 | B64C 11/008 |
| GB | 2192943 A * | 1/1988 | B64C 11/06 |
| WO | WO-2008087443 A1 * | 7/2008 | B29C 70/222 |
| WO | WO-2024033590 A1 * | 2/2024 | B64C 11/30 |

* cited by examiner

100

156b

158b

BLADE MANUFACTURING FOR VERTICAL TAKE-OFF DUAL-ENGINE AIRCRAFT

BACKGROUND

Fixed wing aircraft generally take flight by travelling horizontally across a runway until the wings of the aircraft are subject to sufficient lift. The requirement of a runway for fixed wing aircraft to take flight restricts the locations from which the aircraft can be deployed. In the case of regional or short-flight aircraft, such as autonomous drones, in order to be deployed at a location far from a source location, such as across a continent or on another continent, the aircraft generally is transported on a larger vessel (e.g., a cargo aircraft or a ship). The use of the larger vessel to transport the aircraft restricts the size of the aircraft (e.g., the fixed wings are subject to dimensional requirements of the larger vessel).

For fixed wing aircraft, deployment of the aircraft requires the aircraft to be assembled on site. Assembly of aircraft is very laborious, thereby restricting the ability for rapid deployment of the fixed-wing aircraft. Further, assembly of the aircraft requires sophisticated operators that have been trained on the design and assembly of the aircraft.

Vertical Takeoff and Landing (VTOL) aircraft, including helicopters, tiltrotors, and multicopters, rely on rotor blades to generate lift and propulsion for hovering, maneuvering, and transitioning between vertical and horizontal flight modes. Various factors influence the design and performance of rotor blades, including aerodynamic efficiency, structural integrity, weight, noise, and vibration characteristics. Traditional rotor blade designs often involve compromises between these factors, leading to limitations in overall aircraft performance and operational envelope.

BRIEF DESCRIPTION OF THE DRAWINGS

Various embodiments are disclosed in the following detailed description and the accompanying drawings.

DETAILED DESCRIPTION

Figure 1:
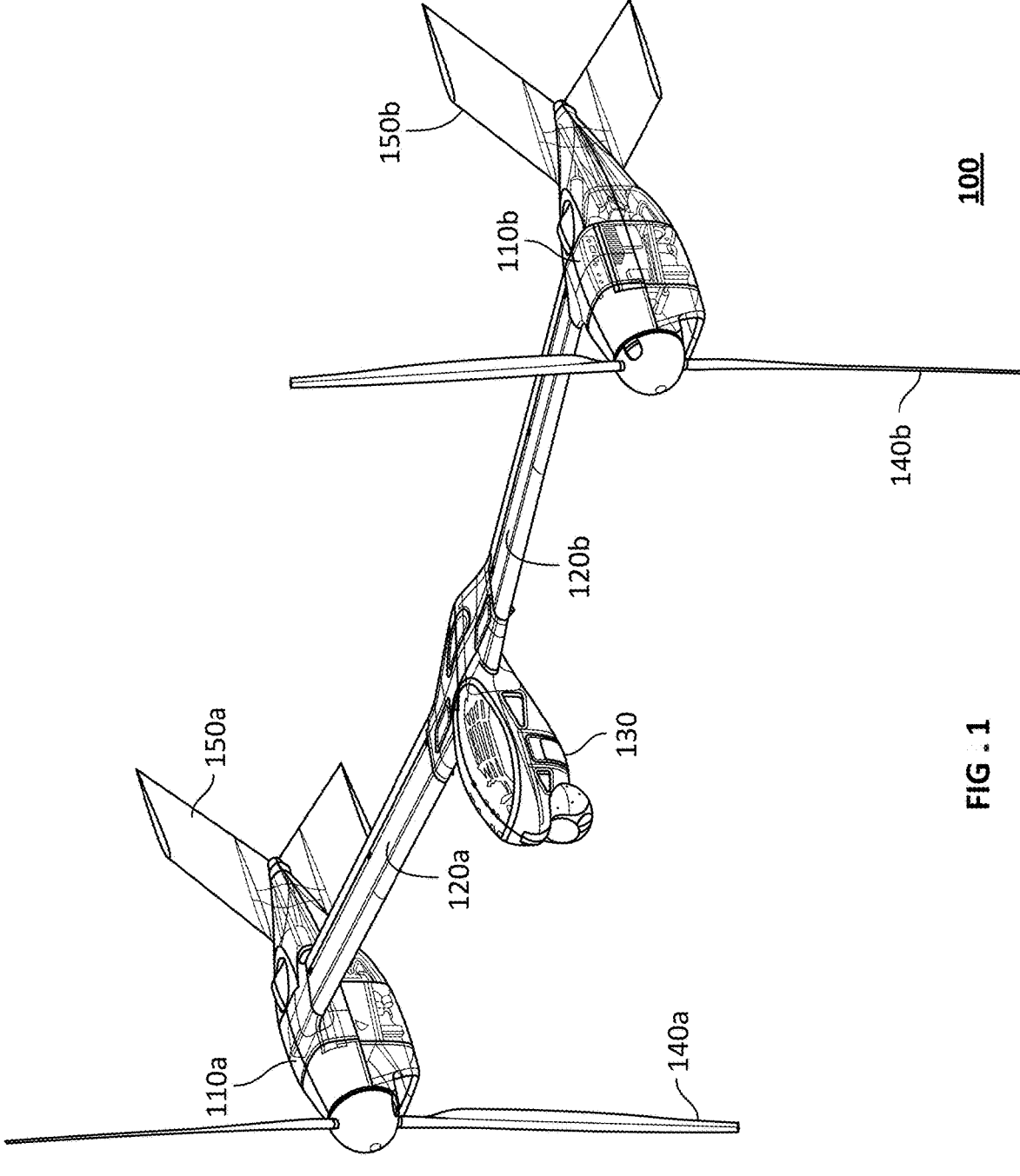
FIG. 1 is a perspective diagram of an aircraft according to various embodiments.

The disclosed can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the disclosed may take, may be referred to as techniques. In general, the order of the steps of processes may be altered within the scope of the disclosed. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the disclosed is provided below along with accompanying figures that illustrate the principles of the disclosed. The disclosed is described in connection with such embodiments, but the disclosed is not limited to any embodiment. The scope of the disclosed is limited only by the claims and the disclosed encompasses numerous alternatives, modifications and equivalents. Numerous specific details are set forth in the following description in order to provide a thorough understanding of the disclosed. These details are provided for the purpose of example and the disclosed may be practiced according to the claims without some or all of these specific details. For the purpose of clarity, technical material that is known in the technical fields related to the disclosed has not been described in detail so that the disclosed is not unnecessarily obscured.

Various embodiments provide rotor system for an aircraft that includes one or more rotor blades respectively connected to the rotor via a blade cuff, and a method of manufacturing the rotor system. The rotor system includes (i) a blade cuff coupled to a blade, wherein a distal end diameter of the blade cuff is larger in diameter than a middle portion diameter of the blade cuff, and (ii) a blade. The blade is wrapped in a plurality of fibers. At least a subset of the plurality of fibers extend longitudinally down the blade from wrapping the middle portion diameter of the blade cuff and continuing past the distal end diameter of the blade cuff. The blade comprises a plurality of weights disposed in a forward edge section of the blade to balance a front side of the blade and a backside of the blade.

Various embodiments provide a method of manufacturing a rotor blade assembly. The method includes (i) disposing a subset of a plurality of fibers to extend longitudinally down a blade from wrapping a middle portion diameter of a blade cuff and continuing past a distal end diameter of the blade cuff, and (ii) disposing a plurality of weights in a forward edge section of the blade to balance a front side of the blade and a backside of the blade. In some embodiments, the distal end diameter of the blade cuff is larger in diameter than the middle portion diameter of the blade cuff. As an example, the plurality of fibers are composed of fiberglass or carbon fibers. The method may additionally include placing in an injection mold cavity the components of the rotor blade assembly in a predefined orientation, introducing a resin into the injection mold cavity, and curing the resin.

Various embodiments provide an aircraft to which the rotor blade assembly is installed. The aircraft may be configured to perform vertical take-off and landing, and to perform horizontal flight. The aircraft comprises (i) a first wing and a second wing, (ii) a fuselage disposed between the first wing and the second wing, and (iii) a first engine and a second engine. The first engine and the second engine respectively comprise an engine to which one or more rotor blade assemblies are installed. In some embodiments, each engine comprises two rotor blades, and thus two rotor blade assemblies.

Various embodiments provide a rotor blade assembly comprising the blade cuff and the rotor blade. The rotor blade assembly is configured to be detachably connected to an aircraft rotor. The blade cuff and a corresponding mating module of the rotor may be configured to enable the rotor blade assembly to be quickly attached and detached during assembly or disassembly of an aircraft.

Various embodiments provide an aircraft that is configured to perform 1) a vertical take-off and landing and 2) a horizontal flight. The aircraft (e.g., the aircraft control system) comprises one or more processors, and a memory coupled to the one or more processors and configured to provide the one or more processors with instructions. The aircraft is a fixed-wing aircraft that can be stowed (e.g., in a stowed state) and transported in a cargo hold of a vessel. The aircraft may be configured to be assembled/disassembled for transport to a location for deployment. The aircraft includes two engines comprising rotors and rotor blades. The engines have a fixed orientation relative to the fuselage and the aircraft wings. In some embodiments, the rotor blades are designed to operate to during both (i) take-off and landing, and (ii) horizontal flight. Accordingly, the rotor blades are shaped to provide sufficient lift during takeoff while still enabling horizontal flight.

In some embodiments, the rotor blades are connected to the aircraft rotor via a blade cuff. For example, a rotor blade and blade cuff is assembled into a rotor blade assembly, which can be connected to, or detached, from the rotor. The rotor blade assembly is configured to be detachably connected to the rotor.

A blade cuff, also known as a blade root cuff or simply cuff, is a structural component located at the root of a rotor blade in a helicopter or other rotorcraft. It serves as the interface between the rotor blade and the rotor hub, providing a means for attaching the blade securely to the hub while allowing for articulation and control of the blade.

The blade cuff typically comprises a metal or composite fitting that is shaped to match the geometry of the attachment points on the rotor hub. It is designed to withstand the aerodynamic forces and mechanical loads experienced during flight, as well as the centrifugal forces generated by the rotating rotor system.

The blade cuff is securely fastened to the rotor hub using mechanical fasteners such as bolts or screws. These fasteners pass through matching holes in the cuff and corresponding attachment points on the hub, ensuring a strong and reliable connection between the blade and the hub. In typical designs, the blade cuff is designed to be fixedly mounted to the rotor, thereby preventing ease of disassembly. In some embodiments, the blade cuff is configured to be detachably connected/mounted to the rotor to ensure a strong and reliable connection while enabling a quick connection/disconnection (e.g., to facilitate a quick assembly or disassembly of the aircraft).

In addition to providing attachment, the blade cuff may also incorporate features for pitch control and articulation. This may include provisions for mounting pitch bearings, hydraulic actuators, or other mechanisms that allow the pilot to adjust the pitch angle of the rotor blade for collective and cyclic control of the aircraft.

Rotor blades are typically connected to the blade cuff through a combination of mechanical fasteners and structural bonding techniques. The conventional configuration of a blade cuff-rotor connection configuration includes:

Blade Root Design: At the root of each rotor blade, there is a corresponding blade root fitting or root end cap. This component is designed to match the geometry of the attachment points on the blade cuff. It often includes features such as bolt holes, keyways, or slots to facilitate attachment and alignment with the blade cuff.

Blade Cuff Design: The blade cuff is the part of the rotor hub where the blade root fittings are attached. It provides a secure mounting interface for the rotor blades while allowing them to pivot around their pitch axis for control purposes. The blade cuff is typically made of metal and is designed to withstand the aerodynamic forces and mechanical loads experienced during flight.

Mechanical Fasteners: The primary method of attaching rotor blades to the blade cuff is through mechanical fasteners, such as bolts or screws. These fasteners pass through matching holes in the blade root fittings and corresponding attachment points on the blade cuff. The fasteners are tightened to a specified torque to ensure a strong and reliable connection between the blade and the blade cuff.

Structural Bonding: In addition to mechanical fasteners, structural adhesive may be applied between the blade root and the blade cuff interface to provide additional bonding strength and rigidity. The adhesive is typically a high-strength epoxy resin that cures to form a durable bond between the mating surfaces. This bonding process helps to distribute loads more evenly across the attachment interface and can enhance the overall strength and stiffness of the connection.

Assembly Process: During assembly, the blade root fittings are carefully positioned and aligned with the attachment points on the blade cuff. Mechanical fasteners are inserted through the pre-drilled holes in the fittings and cuff, and then tightened to the specified torque using torque wrenches or other tools. Structural adhesive may be applied between the mating surfaces before or after fastening to ensure proper bonding.

According to various embodiments, the rotor blade assembly comprises an integrated rotor blade and blade cuff. The rotor blade and blade cuff are manufactured in a manner that integrates both components. For example, the rotor blade roots are inserted to the blade cuff during manufacture and the rotor blade and blade cuff are fused together. In some embodiments, fibers are laid to extend substantially longitudinally along the rotor blade and to extend longitudinally across at least part of the blade cuff. The fibers are configured to extend from the rotor blade to a rotor blade shoulder so that upon fusing of the resin the fibers grip the rotor blade shoulder to provide additional support in the connection between the blade cuff and rotor blade.

VTOL (Vertical Takeoff and Landing) aircraft can utilize various types of rotors, depending on the specific design and requirements of the aircraft. The choice of rotor configuration often depends on factors such as efficiency, stability, maneuverability, and noise levels. Examples of common types of rotors used in VTOL aircraft include tiltrotors and multicopter configurations.

Tiltrotor aircraft, like the Bell Boeing V-22 Osprey, feature rotors that can tilt between vertical and horizontal positions. This allows the aircraft to take off and land vertically like a helicopter and transition to horizontal flight like a fixed-wing aircraft. Tiltrotors combine the vertical takeoff and landing capability of helicopters with the speed and range of fixed-wing aircraft, offering versatility for various mission profiles.

VTOL drones often utilize multicopter configurations, featuring multiple rotors arranged in a multi-rotor layout (such as quadcopters, hexacopters, or octocopters). These configurations provide stability, redundancy, and maneuverability, making them suitable for a wide range of applications, including aerial photography, surveying, and parcel delivery. Multicopters are typically electrically powered and rely on precise control of rotor speeds for stability and maneuvering.

Rotor blades for VTOL aircraft, especially those used in tiltrotors and lift fans, are designed to accommodate both vertical and horizontal flight. This requires a careful balance of aerodynamic characteristics to ensure efficient lift generation during takeoff and landing, as well as optimized performance during forward flight. Design considerations for rotor blades in VTOL aircraft include twist, airfoil shape, and blade sweep.

Rotor blades often feature twist along their length, with a higher angle of attack near the root and a lower angle of attack towards the tip. This twist distribution helps to optimize the aerodynamic performance of the blade across the entire rotor disk during various flight conditions. In some embodiments, the twist of a rotor blade for a VTOL aircraft is specifically configured to provide sufficient lift during vertical takeoff and landing while minimizing drag during forward flight.

The airfoil shape of rotor blades is designed to achieve a balance between lift, drag, and stall characteristics. During vertical flight, the rotor blades need to generate high lift at low airspeeds, requiring airfoils with high lift coefficients and good stall resistance. During horizontal flight, the airfoil should also provide efficient lift-to-drag ratio to minimize drag and improve fuel efficiency.

Some rotor blades may feature sweep along their span, especially in tiltrotor aircraft. Swept blades help to reduce the effects of compressibility and improve the blade's performance at higher forward speeds. However, the amount of sweep is typically limited to maintain good hover performance and control authority during vertical flight.

According to various embodiments, the rotor blade assembly comprise fibers (e.g., a cured resin that is supported by a plurality of fiberglass or carbon fibers). For example, the rotor blade assembly is manufactured using a process called resin infusion or resin transfer molding (RTM). This process involves infusing resin into a fiber reinforcement material to create a strong, lightweight, and aerodynamically efficient blade. The manufacturing of the rotor blade assembly includes (i) a blade design and mold preparation step, (b) a fiber layup step, (c) a resin infusion step, (d) a curing step, (e) a demolding and finishing step. The manufacturing process may additionally include a quality control and testing step. These steps are described further below.

Blade Design and Mold Preparation: The manufacturing process begins with the design of the rotor blade geometry and aerodynamic profile. In some embodiments, a set of blade components are arranged/oriented and connected (e.g., bonded) to form the blade rotor blade geometry and aerodynamic profile. Once the set of blade components are arranged or bonded, a mold or tooling is created based on the rotor blade shape. The mold is typically made from metal, composite materials, or other durable materials capable of withstanding the molding process. For example, the set of blade components includes a forward edge section, a front core section, and a back core section. One or more of the forward edge section, front core section, and back core section may be pre-formed shapes that are later placed into an injection molding mold cavity for fusing the components of the rotor blade assembly.

Fiber Layup: Layers of fiber reinforcement material, such as woven fiber cloth or unidirectional fibers, are laid up or positioned onto one or more pre-formed shape surfaces according to the blade design. The orientation and arrangement of the fiber layers are carefully planned to optimize the blade's strength, stiffness, and aerodynamic performance. In some embodiments, a plurality of fibers are laid up across the shape of the rotor blade assembly. The rotor blade assembly comprises (i) a first set of fibers that are laid up in a direction parallel to the longitudinal direction of the rotor blade, and (ii) a second set of fibers that are laid up in a direction orthogonal or at an another angle to the first subset of fibers (e.g., laid up in a direction parallel to or at an angle to the width of the rotor blade). The rotor blade may additionally comprise fibers oriented at various angles relative to the first set of fibers and/or second set of fibers. At least a subset of the first set of fibers are oriented so the fibers extend from the rotor blade and past at least a shoulder of the blade cuff. The plurality of fibers may comprise fibers having different lengths. In some embodiments, the fibers are laid up manually by a human operator.

Resin Infusion: In the resin infusion process, the mold with the fiber layup is enclosed within a vacuum bag or sealed mold cavity. A network of channels or ports, called resin feed lines, is integrated into the mold to facilitate resin flow throughout the fiber reinforcement. Liquid resin, typically a thermosetting epoxy or polyester resin, is then introduced into the mold under vacuum pressure.

Curing: Once the mold is filled with resin, it is placed in an oven or heated environment to initiate the curing process. Curing involves the cross-linking of the resin molecules, which creates a strong and durable bond between the fiber reinforcement layers. The curing temperature and duration are carefully controlled to ensure proper polymerization and consolidation of the composite materials.

Demolding and Finishing: After curing, the rotor blade assembly (e.g., the rotor blade and blade cuff) is carefully demolded from the mold. Excess resin and flashings may be trimmed, and any imperfections or irregularities on the blade surface are smoothed out. The blade may undergo additional finishing processes such as sanding, polishing, or painting to achieve the desired surface finish and aesthetics.

Quality Control and Testing: Throughout the manufacturing process, various quality control measures are implemented to ensure that the rotor blade assemblies meet performance and safety standards. In some embodiments, the performance and safety standards may be less stringent than aircraft expected to carry passengers. For example, the aircraft may be designed to be cost effective and assumed to be more disposable than traditional passenger-carrying aircraft. Non-destructive testing (NDT) techniques such as ultrasonic inspection, X-ray inspection, and visual inspection are performed to detect defects or anomalies in the composite materials. Additionally, mechanical testing, static load testing, and fatigue testing may be conducted to validate the structural integrity and performance characteristics of the rotor blades.

In some embodiments, the plurality of fibers are laid up substantially in accordance with a predefined fiber orientation schedule. The fiber orientation schedule, also known as the layup schedule, specifies the arrangement and orientation of fibers at different locations along the length and span of the rotor blade assembly (e.g., a length and span of the rotor blade, or along at least part of the length/span of the rotor blade and the length/span of the rotor cuff). The fiber orientation schedule can be determined based at least in part on the rotor blade design requirements, including structural loads, aerodynamic forces, and performance goals. For example, the fiber orientation schedule can be determined using computational tools and structural analysis techniques to optimize the fiber orientation schedule for maximum efficiency and performance.

In some embodiments, after the fiber reinforcement material is laid up onto the mold surface, vacuum bagging techniques may be employed to consolidate the layup and remove trapped air between the layers. Vacuum pressure helps to compact the fiber and resin, ensuring proper wetting out of the fibers and uniform distribution of resin throughout the layup. This consolidation process helps to improve the mechanical properties and structural integrity of the finished rotor blade assembly.

According to various embodiments, the aircraft is configured to be disassembled or collapsed (e.g., to a stowed state) in a manner according to which the collection of aircraft components may fit within a predefined volume. For example, the aircraft may be disassembled/collapsed, such as for transit of the aircraft to a distant location (e.g., another side of a continent, another continent, an island, etc.), and all (or substantially all) components for the aircraft fit within a standard envelope/volume (e.g., a box or pallet). As an example, the standard envelope/volume may be a V-22 cargo envelope. As another example, the predefined volume fits within a cargo bay for a transport vessel. In the case of the transport vessel being a V-22 vehicle, the predefined volume fits within a volume having 5.7-foot width by 5.5-foot height by 20.8 foot long. In some embodiments, the aircraft is designed such that each component fits within dimensional constraints of the envelope/volume (e.g., box or pallet) in which the aircraft is to be stored/transported. In some embodiments, the aircraft is designed so that a first wing, a second wing, a fuselage, a first engine nacelle, and a second engine nacelle fit within the dimensional constraints of the envelope/volume. In some embodiments, the aircraft is designed so that a first wing, a second wing, a fuselage, a first proprotor, a second proprotor, a first engine nacelle, and a second engine nacelle fit within the dimensional constraints of the envelope/volume.

The aircraft may be transported on a cart. The aircraft can be transported in a stowed state (e.g., a state in which the aircraft is at least partially disassembled) and transitioned out of the stowed state (e.g., to a fully assembled state) upon arrival at the location from which the aircraft is to be deployed. The cart may have wheels that facilitate easy loading and offloading from the vessel in which the stowed aircraft is transported, and to move the cart to the desired destination from which the aircraft is to be deployed.

The cart comprises a set of cart members that respectively support certain aircraft components (e.g., support during transport and during the transitioning out of the stowed state, etc.) and/or guide the aircraft components to predefined orientations or locations such as for assembly. Examples of the aircraft components include a fuselage, a center wing, a left wing, a right wing, a left nacelle, a right nacelle, etc. Additionally, the cart may include a module(s) in which proprotors are stowed and/or a module that carries fuel to be used to fill the aircraft for deployment. In some embodiments, the cart comprises a set of actuation systems that respectively actuate certain cart members such as in connection with moving or re-orienting (e.g., rotating) the aircraft components.

In some embodiments, the cart comprises a control system. The control system controls the various actuation systems comprised in the cart. For example, the system controls the actuation systems to actuate the corresponding cart members in connection with moving/re-orienting the aircraft components. The control system may control the actuation systems based at least in part on sensor data obtained from sensors comprised in the cart and/or a predefined plan or command input by a user. As an example, the control system controls the actuation systems to automatically move/re-orient the aircraft components to transition the aircraft into or out of a stowed state, such as in connection with assembling or disassembling the aircraft. The control system controls the system to automatically move the aircraft components according to a predefined plan, which may comprise a sequence of steps that are to be performed. As an example, each step includes a set of instructions for actuating one or more cart members to configure the aircraft components.

The cart may comprise a primary controller and a set of secondary controllers. The primary controller is configured to operate the pre-defined plan or respond to user input. For example, the primary controller is configured to: (i) determine a high-level task for assembling a subset of the aircraft, and (ii) provide the high-level task to at least one secondary controller in the set of one or more secondary controllers.

The secondary controllers are respectively located proximate to their corresponding actuation systems/cart members. For example, a secondary controller that controls actuation of the cart member(s) supporting the fuselage is disposed proximate to the mechanism for actuating the cart member (s).

In some embodiments, the control system (e.g., the primary controller and/or set of secondary controllers) implements a predefined sequence. The control system may store one or more predefined sequences, such as a sequence for transitioning the aircraft out of a stowed state (e.g., in connection with assembly of the aircraft), a sequence for transitioning the aircraft into the stowed state (e.g., in connection with disassembly of the aircraft), a sequence for performing a cart diagnostic, etc. The predefined sequences for transitioning the aircraft into or out of a stowed state may be configured to move the cart member(s) in a sequence and/or timing in a manner that avoids collisions between cart member(s) and/or aircraft component(s). In some embodiments, implementing the predefined sequence includes performing a subset of steps in parallel and a subset of steps in series.

The cart comprises a set of actuation systems that respectively actuate certain cart members to move/re-orient the aircraft components. In some embodiments, the cart comprises at least one actuation system for each axis with respect to which the cart member(s)/aircraft components are to be moved. An actuation system may comprise a power source (e.g., an input that receives power from the cart's main power source), a motor to move a cart member in connection with moving an aircraft component, and a controller configured to actuate (e.g., drive) the motor. Additionally, the actuation system comprises one or more sensors to detect a state of the actuation system and/or cart member. For example, the actuation system may comprise a joint encoder that is configured to measure a joint angle. The joint encoder may be a magnetic encoder, optical coders, etc. The motor may drive a joint screw to cause the cart member to move. Various other types of actuation systems may be implemented, such as a pneumatic system that drives a hydraulic piston, etc.

Figure 2:
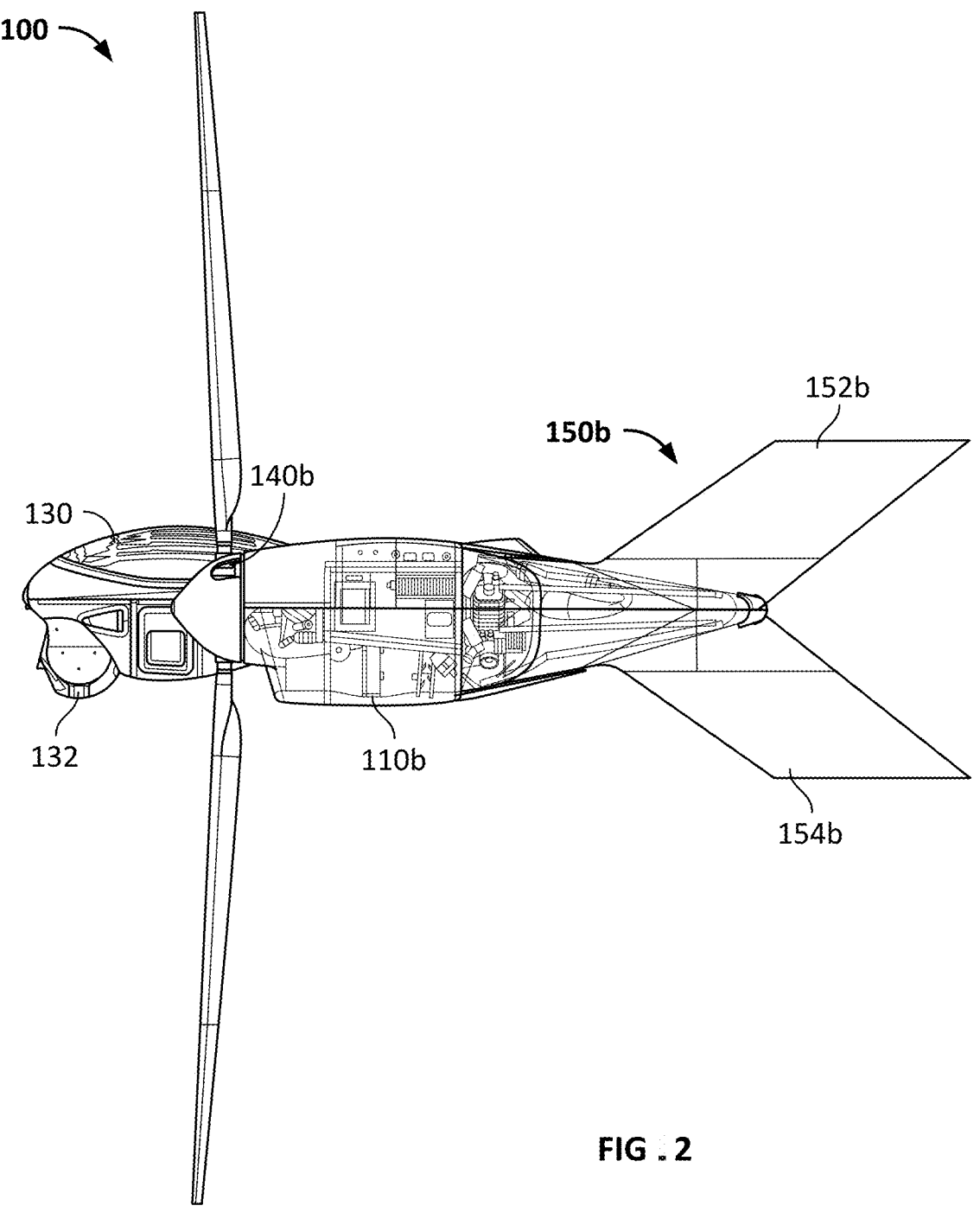
FIG. 2 is a side view diagram of an aircraft according to various embodiments.
Figure 3:
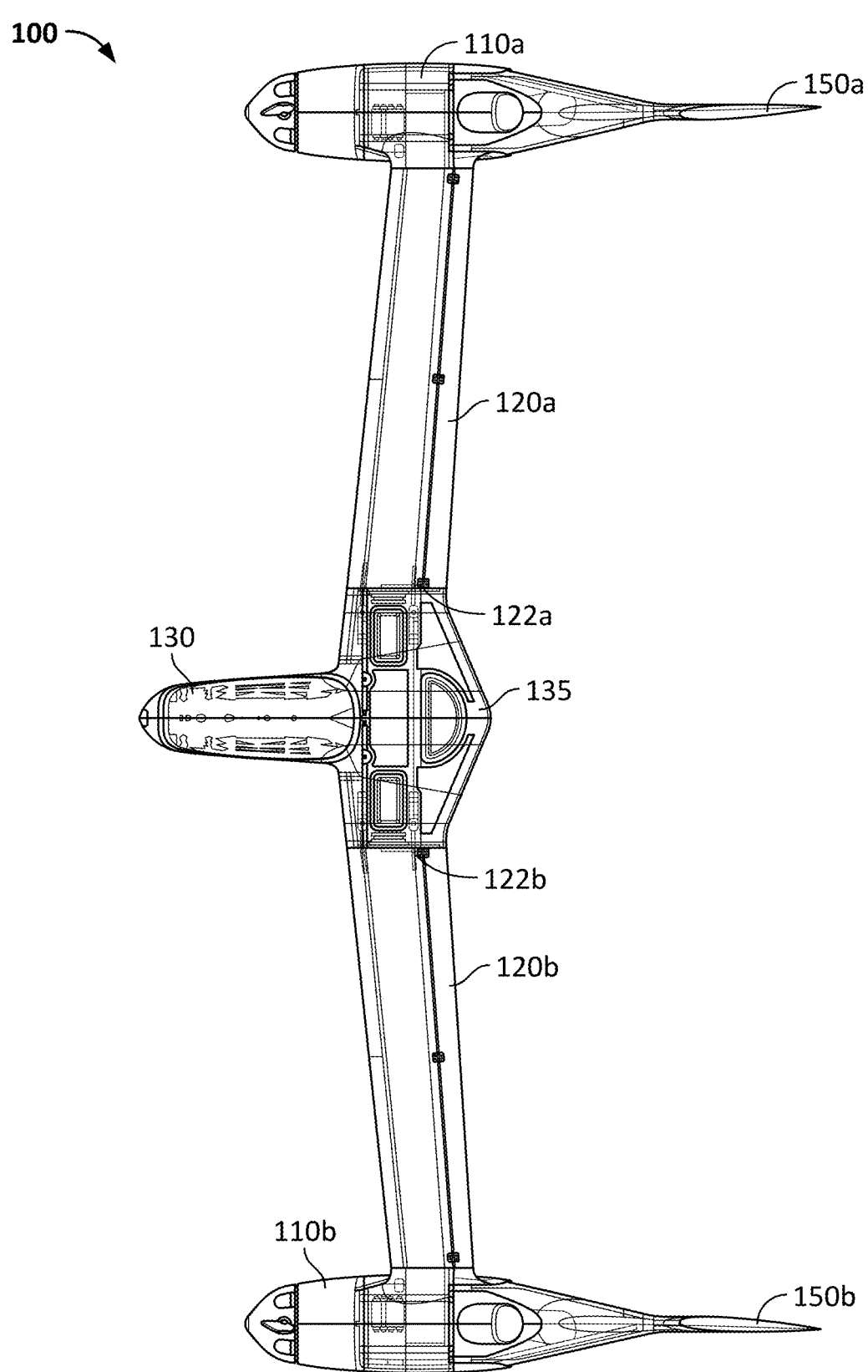
FIG. 3 is a top view diagram of an aircraft according to various embodiments.

FIGS. 1-3 are respectively a perspective, side-view, and top-view diagrams of an aircraft according to various embodiments. As shown in FIG. 1, aircraft 100 comprises first wing 120a and second wing 120b. First wing 120a and second wing 120b are mounted (e.g., fixedly mounted) to fuselage 130. Aircraft 100 further comprises first nacelle 110a and second nacelle 110b comprising propulsion systems that operate to take-off, land, or fly aircraft 100. In some embodiments, aircraft 100 comprises winglets, such as first winglet 150a and second winglet 150b.

In some embodiments, aircraft 100 is configured to vertically take-off and/or landing. First nacelle 110a and/or second nacelle 110b may include landing module(s). For example, aircraft 100 rests on a first landing module comprised in first nacelle 110a and a second landing module comprised in second nacelle 110b with the length of fuselage 130 extending vertically. The first landing module and the second landing module may fold into first nacelle 110a and second nacelle 110b, respectively, which allows the landing gear to cause low drag during flight operation. For example, the landing module folds into winglets (e.g., first winglet 150a, second winglet 150b) of first nacelle 110a and second nacelle 110b. As another example, propulsion systems (e.g., first proprotor 140a and second proprotor 140b) are positioned at one end of a nacelle (e.g., first nacelle 110a and second nacelle 110b) and the landing gear is positioned within the tail assembly that includes the winglets (e.g., first winglet 150a and second winglet 150b) at the other end of the tail assembly. In some embodiments, aircraft 100 is enabled to rest on the ground with the proprotors at the top and the landing gear positioned at the bottom/on the ground.

The first proprotor 140a and second proprotor 140b may respectively comprise a plurality of rotor blades. In the example shown, first proprotor 140a and second proprotor 140b each comprise two rotor blades. In some embodiments, each rotor blade is comprised in a rotor blade assembly. The rotor blade assembly includes the rotor blade and a blade cuff that is used to detachably connect the rotor blade assembly to first proprotor 140a and second proprotor 140b. Examples of the rotor blade assembly are further provided in FIGS. 7B-7G, 8A-8B, and 9-17.

The lengths of first nacelle 110a and second nacelle 110b are constrained by the distance between the end of the nacelle and the ground when the aircraft is facing upwards for take-off/landing. The landing module folds out of first nacelle 110a and second nacelle 110b (e.g., first winglet 150a, second winglet 150b). Accordingly, if the nacelles are too short, the landing modules (e.g., landing gear/landing gear system) may not have sufficient track and thus lead to instability when the vehicle is resting on the landing modules. For example, the track of the landing module should be sufficiently long to ensure that aircraft 100 does not fall over when resting on the landing module (e.g., when aircraft 100 is in a landed state). In addition, the nacelles and/or landing module are configured to have a length to provide sufficient clearance for all payloads that are carried by (e.g., mounted to) aircraft 100.

In some embodiments, the airframe design (e.g., shape of first wing 120a, second wing 120b, first nacelle 110a, and/or second nacelle 110b) is configured to balance performance during vertical take-off/landing and performance during horizontal cruise. For example, the airframe is designed to provide a good (e.g., a stable) transition from vertical take-off mode to horizontal cruise mode (or from horizontal cruise mode to vertical landing mode). Certain components of aircraft 100 may be selected based on stiffness and/or strength required to withstand the forces during vertical take-off and horizontal cruise. For example, the wings, nacelles, or landing gear modules (e.g., the frame or housing around the leg) may comprise composite materials (e.g., fiberglass, Hexply® M77 prepreg, etc.). As another example, the rotor blades attached to first proprotor 140a and second proprotor 140b may comprise fiberglass. The airframe further includes mechanical joints between components (e.g., the wing-nacelle interface or wing-fuselage interface), which are also low drag. According to various embodiments, the joints/interfaces between components are designed to optimize (e.g., minimize) drag. Aircraft 100 may comprise a control system that is used to control the distribution/redistribution of fuel to provide appropriate balance of aircraft 100 during operation in different pitches/orientations.

According to various embodiments, aircraft 100 comprises one or more landing modules (e.g., landing gear systems) that cause low drag during flight operation. For example, when the landing gear system(s) is configured in the stowed state, the landing gear system has an aerodynamic (e.g., drag efficient) profile. The aerodynamic profile may be configured based on the shape of a leg or a frame or housing around the leg(s) of the landing gear system.

In some embodiments, the landing gear system comprises a first leg and a second leg. The first leg and the second leg are configured to split apart when the first landing gear is in the deployed state. When configured in the deployed state, the first leg and the second leg are split apart by at least a threshold distance. As an example, the first leg comprises a foot disposed at a distal end of the first leg, and the second leg comprises a wheel disposed at a distal end of the second leg. In some embodiments, the landing gear system comprises two v-shaped actuators that are configured to transition the first leg and the second leg to a stowed state or a deployed state.

In some embodiments, the landing module comprises one or more winglets. For example, in the case that the landing module comprises a panel design with a first landing support member (e.g., a first leg) and a second landing support member (e.g., a second leg), the landing module may comprise a set of winglets configured on (e.g., connected to) one or more of the landing support members.

In some embodiments, the joints between components in aircraft 100 are optimized to balance performance during take-off/flight and support for a quick assembly. For example, various embodiments include wings (e.g., first wing 120a, second wing 120b) that are hinged with respect to the center wing and/or fuselage 130. In a disassembled state, the wings are folded inwards to form a horseshoe shape with the center wing of fuselage 130. Thus, rapid deployment of aircraft 100 includes unfolding the wings and fixedly mounting the wings to fuselage 130 (e.g., to the center wing of fuselage 130). Although use of folding wings does not optimize aircraft 100 for weight, the folding wings facilitate use of a relatively stiffer/stronger joint for the wings.

First winglet 150a and second winglet 150b may comprise flight-control (e.g., the control system) or communication components. For example, first winglet 150a and/or second winglet 150b may be configured to comprise (e.g., mounted on) an antenna such as a vertically polarized antenna.

The propulsion system of aircraft 100 may be a jet engine, a piston engine, a gas turbine, a propeller, or a motor, such as an electric motor. Various other types of propulsion systems may be implemented. In some embodiments, the propulsion system comprises one or more proprotors. In the example shown, aircraft 100 comprises first proprotor 140a and second proprotor 140b.

In some embodiments, the proprotor (e.g., first proprotor 140a, second proprotor 140b, etc.) includes one or more blades that are removable. The length of the proprotors (e.g., the rotor blades) is constrained by the length of the wing. For example, the length of the rotor blade is less than the length of the wing to provide clearance between fuselage 130 and the proprotor. The one or more proprotors may respectively have at least two rotor blades having a length of at least 5 feet. For example, first proprotor 140a comprises two rotor blades having a length of 10 feet. The relatively large blades allow aircraft 100 to have a higher cruise speed than aircraft propelled by smaller rotor blades. As an example, the blades are driven by an internal combustion engine (e.g., a heavy fuel internal combustion engine). As another example, the blades are driven by an electric motor. The use of rotor blades for propulsion balances the need to be resilient while taking off vertically and cross winds that may occur during vertical take-off. For example, the proprotors include a two-motor swashplate on each rotor, which facilitates improved stability and resilience to cross winds. In some embodiments, the rotor blades are mounted to the proprotor in a tool-less integration.

In some embodiments, aircraft 100 is configured to carry a payload. The payload may be mounted to fuselage 130 or the wings (e.g., first wing 120a and second wing 120b). Examples of payloads include cameras (e.g., electro-optical/infra-red (EO/IR) systems), weapons, packages, etc. Various other payloads may be implemented. Aircraft 100 may comprise one or more sensor mounts or payload mounts to which sensors or payloads are mounted. In the example shown in FIG. 2, aircraft 100 comprises EO/IR system 132 mounted to the chin of fuselage 130.

In some embodiments, aircraft 100 comprises an internal combustion engine. For example, aircraft 100 comprises a first internal combustion engine within first nacelle 110a and a second internal combustion engine within second nacelle 110b. First nacelle 110a and second nacelle 110b are detachably mounted to the wings (e.g., first wing 120a and second wing 120b). During assembly, the nacelles are respectively connected to the wing. The connection between the nacelles and the wings comprises a connection for one or more of fuel lines, communication lines (e.g., signals received via antennae in the winglet), and/or control systems (e.g., wiring for a system computer to control the various operations of aircraft 100, such as driving the engines or actuating the landing modules). In some embodiments, aircraft 100 comprises a fuel reservoir (e.g., a third fuel tank) in fuselage 130. Accordingly, fuel is transferred from fuselage 130 to the engines in the nacelles via fuel connections between the applicable nacelle and fuselage 130 that couple the fuel reservoir to the fuel lines or reservoirs in the wings. In some embodiments, aircraft 100 is able to balance the fuel weight by shifting fuel volume between fuselage 130, first nacelle 110a, and second nacelle 110b. In some embodiments, aircraft 100 is able to balance the fuel weight by shifting fuel volume between fuselage 130, first wing 120a, second wing 120b, first nacelle 110a, and second nacelle 110b.

In some embodiments, the connections between the nacelles and the wings are designed for optimization in assembly/disassembly. For example, aircraft 100 includes a secure and quick connection between the nacelles and the wings. As an example, the one or more connections between the nacelles and the wings (e.g., between first nacelle 110a and first wing 120a, etc.) comprise a blind mate connection. The connections between the nacelles and the wings may include dry connections for connecting the fuel lines/pathways from the wing to the nacelles (e.g., to the nacelle fuel tanks).

In some embodiments, aircraft 100 comprises fuel reservoirs in the wings and/or nacelles. For example, a first fuel tank is located in first wing 120a and a second fuel tank is located in second wing 120b. Aircraft 100 may also comprise a fuel reservoir (e.g., the third fuel tank) in fuselage 130. Aircraft 100 comprises a control system (e.g., a computer) that manages delivery of fuel to the engines. The control system controls a use of fuel from the third fuel tank based at least in part on fuel consumption of fuel in the first fuel tank and the second fuel tank. The control system may control the use of fuel from the third fuel tank based on consumption of fuel in the first fuel tank relative to consumption of fuel in the second fuel tank. For example, the control system controls delivery of fuel to ensure that the first fuel tank and the second fuel tank comprise substantially the same amount of fuel (e.g., an amount of fuel within a threshold range). Delivery of the fuel from the third fuel tank to the first fuel tank and the second fuel tank can be used to ensure that aircraft 100 is balanced during flight.

Aircraft 100 comprises one or more landing gear systems. The landing gear system(s) may be disposed at the aft of aircraft 100 (e.g., the aft of the corresponding nacelle). Aircraft 100 uses a control system to control the configuration of the landing gear systems, such as to transition the landing gear module between a stowed state and a deployed state. The landing gear system comprises one or more legs that are sufficiently strong to support the weight of the aircraft when in the deployed state. In some embodiments, the landing gear system comprises an actuator system(s) that actuates the landing module (e.g., one or more landing support members in the landing gear system) to configure the landing module in the stowed state (e.g., a state in which the landing gear is retracted for horizontal flight) or the deployed state (e.g., a state in which the landing gear is deployed for take-off or landing).

In some embodiments, the landing module comprises a mechanism to absorb the shock caused when the aircraft (e.g., the feet at the distal end of the landing support members) engages the land during landing. For example, the landing module comprises a shock absorber that enables one or more of the landing support members to move to change a distance between each other. For example, when a shock is introduced to the landing module, the landing support members move to increase the distance between the landing support members. The landing module (e.g., the actuation system) may comprise a biasing element, such as a spring, which enables the landing support member to retract to lessen the distance between the landing support members (e.g., to normalize or respectively move the landing support members to a neutral state).

Aircraft 100 comprises avionics (e.g., a control system) that controls operation of aircraft 100 during fight or take-off/landing. The avionics may be located in fuselage 130 and the mounting/connections for the nacelles to the wings and the wings to the fuselage or central wing (e.g., the fuselage mount) include connections for the avionics to control systems in the wings (e.g., antennae, engines, landing modules, delivery/release of payloads, etc.).

In the example shown in FIGS. 1 and 2, aircraft 100 comprises second winglet 150*b* comprised in, or connected to, second nacelle 110*b* or second wing 120*b*. Second winglet 150*b* comprises a second top winglet 152*b* and a second bottom winglet 154*b*. The winglets may comprise landing modules that are retracted (e.g., folded) into the winglets during flight, and extended during take-off or landing. Fuselage 130 includes EO/IR system 132 and is shown behind second nacelle 110*b* and is coupled to second wing 120*b*. Second nacelle 110*b* has at its second proprotor 140*b*.

In the example shown in FIG. 3, fuselage 130 is mounted to center wing 135. Center wing 135 serves as the nucleus of aircraft 100. For example, first wing 120*a* and second wing 120*b* are mounted (e.g., hingedly mounted) to center wing 135 via first wing hinge mount 122*a* and second wing hinge mount 122*b*. First wing 120*a* and second wing 120*b* may be folded relative to center wing 135 to create a horseshoe shape. During assembly, first wing 120*a* and second wing 120*b* are unfolded and rigidly mounted/connected to center wing 135. In some embodiments, fuselage 130 is hingedly mounted to center wing 135. For example, fuselage 130 may be folded into the space defined by (e.g., within) the horseshoe shape created by the folding of first wing 120*a* and second wing 120*b* relative to center wing 135. First nacelle 110*a* with first winglet 150*a* is coupled to first wing 120*a* at the end opposite being coupled to center wing 135. Second nacelle 110*b* with second winglet 150*b* is coupled to second wing 120*b* at the end opposite being coupled to center wing 135.

In some embodiments, aircraft 100 is configured to have a one-way range of 1000+ nautical miles. Aircraft 100 has an endurance of at least 10 hours. Aircraft 100 is configured to carry a payload of at least 50 lbs. In some embodiments, aircraft 100 has a maximum speed of at least 147 knots.

In various embodiments, aircraft 100 has a wingspan of at least 15 feet, of at least 19 feet, of 18 feet, of 19 feet, or any other appropriate minimum length, length, or maximum length.

Figure 4A:
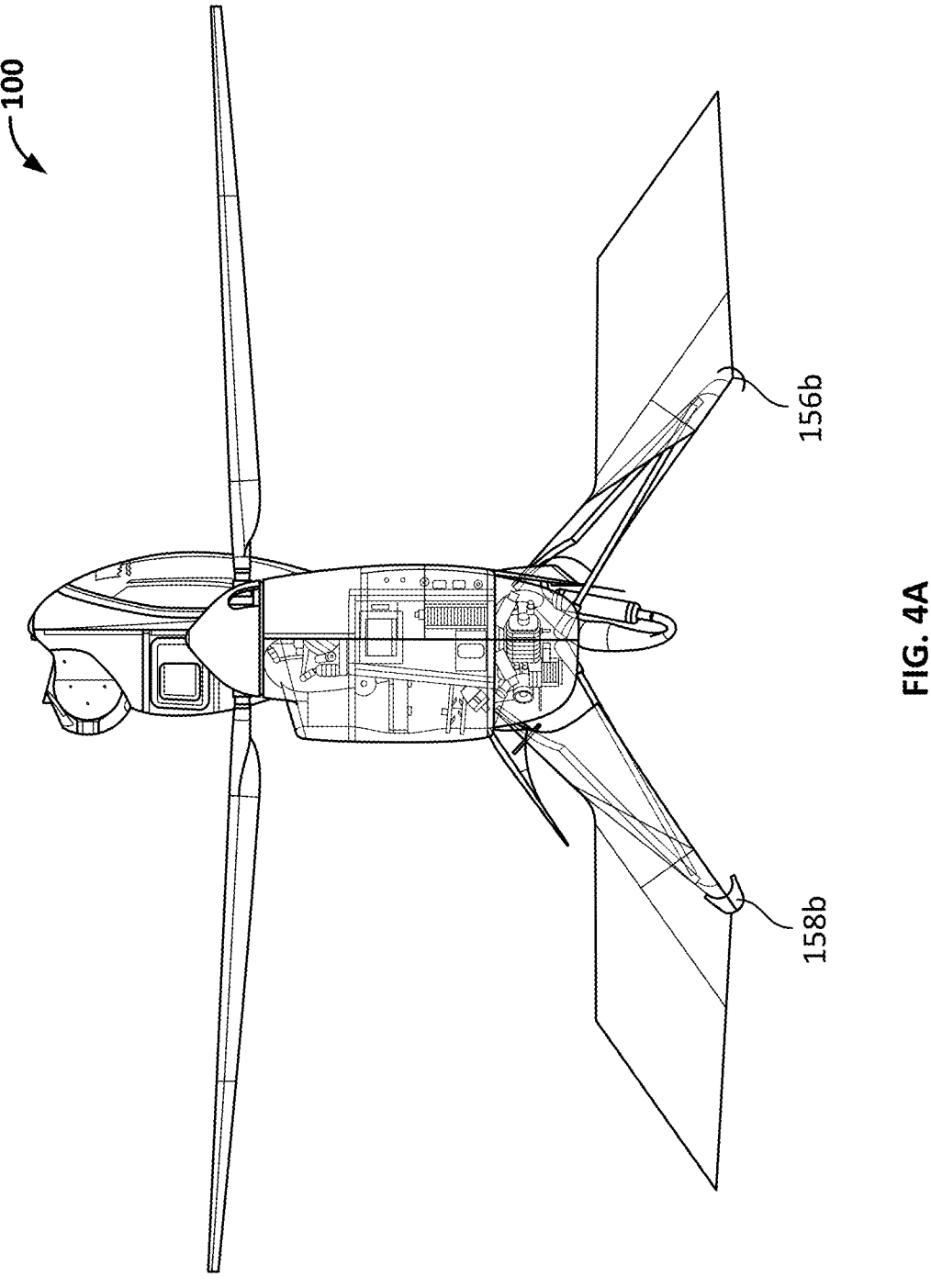
FIG. 4A is a side view diagram of an aircraft in a take-off state according to various embodiments.

FIG. 2 and FIG. 4A are side view diagrams of an aircraft in a horizontal flying state and a vertical take-off state according to various embodiments. In some embodiments, aircraft 100 comprises a low-drag and lightweight landing module that may be extended during take-off or landing, as illustrated in FIG. 4A.

In the example shown in FIG. 2 and FIG. 4A, the landing module of first wing 120*a* (e.g., connected to first nacelle 110*a* or a first top winglet or a first bottom winglet) comprises first landing support member (not shown), such as a first leg, and second landing support member (not shown), such as a second leg. Similarly, the landing module of second wing 120*b* (e.g., connected to second nacelle 110*b* or second top winglet 152*b* or second bottom winglet 154*b*) comprises third landing support member 156*b* and fourth landing support member 158*b*. As illustrated, the first landing support member and the second landing support member provide a wide stance when aircraft 100 is landed. For example, the first landing support member and the second landing support member comprise a panel design. The panels may be retracted during flight to ensure efficient drag management (e.g., a first landing support member and a second landing support member when in the retracted position—for example, a closed clam shell configuration-contribute low drag to aircraft 100). The set of panels of the landing support members in the landing module are profiled such that an aggregate profile of the panels when the landing support members are configured in the stowed state is aerodynamic. As illustrated, third landing support member 156*b* and fourth landing support member 158*b* provide a wide stance when aircraft 100 is landed. For example, third landing support member 156*b* and fourth landing support member 158*b* comprise a panel design. The panels may be retracted (e.g., configured in a stowed state) during flight to ensure efficient drag management (e.g., third landing support member 156*b* and fourth landing support member 158*b* when in the retracted position—for example, a closed clam shell configuration-contribute low drag to aircraft 100).

In some embodiments, the landing module is configured to be relatively expeditionary, such as to provide aircraft 100 with the ability to land/take-off on uneven terrain, odd ground surfaces, or otherwise challenging terrain. For example, a first landing support member and second landing support member and/or third landing support member 156*b* and fourth landing support member 158*b* may be shaped to provide support on uneven or inclined ground surfaces.

FIG. 4A is a side view diagram of an aircraft in a take-off state according to various embodiments. In some embodiments, aircraft 100 comprises a low-drag and lightweight landing module that may be extended during take-off or landing, as illustrated in FIG. 4A.

The landing module of first wing (e.g., first wing 120*a* of FIG. 1 connected to first nacelle 110*a* or first top winglet or first bottom winglet) comprises a first landing support member and a second landing support member. Similarly, in the example shown in FIG. 4A, the landing module of second wing (e.g., second wing 120*b* of FIG. 1 connected to second nacelle 110*b* or second top winglet 152*b* or second bottom winglet 154*b*) comprises third landing support member 156*b* and fourth landing support member 158*b*. As illustrated, third landing support member 156*b* and fourth landing support member 158*b* provide a wide stance when aircraft 100 is landed. For example, third landing support member 156*b* and fourth landing support member 158*b* comprise a panel design. The panels may be retracted during flight to ensure efficient drag management (e.g., third landing support member 156*b* and fourth landing support member 158*b* when in the retracted position—for example, a closed clam shell configuration-contribute low drag to aircraft 100).

In some embodiments, the landing module is configured to be relatively expeditionary, such as to provide aircraft 100 with the ability to land/take-off on uneven terrain, odd ground surfaces, or otherwise challenging terrain. For example, the first landing support member and the second landing support member and/or third landing support member 156*b* and fourth landing support member 158*b* may be shaped to provide support on uneven or inclined ground surfaces.

Although the example shown in FIG. 4A illustrates a landing module with a panel design, various other landing modules may be implemented. An example of a landing module is one formed using the rear of the nacelle and a blade or other member that extends from a retracted state to provide a substantially wide stance between the blade and the rear of the nacelle.

Figure 4B:
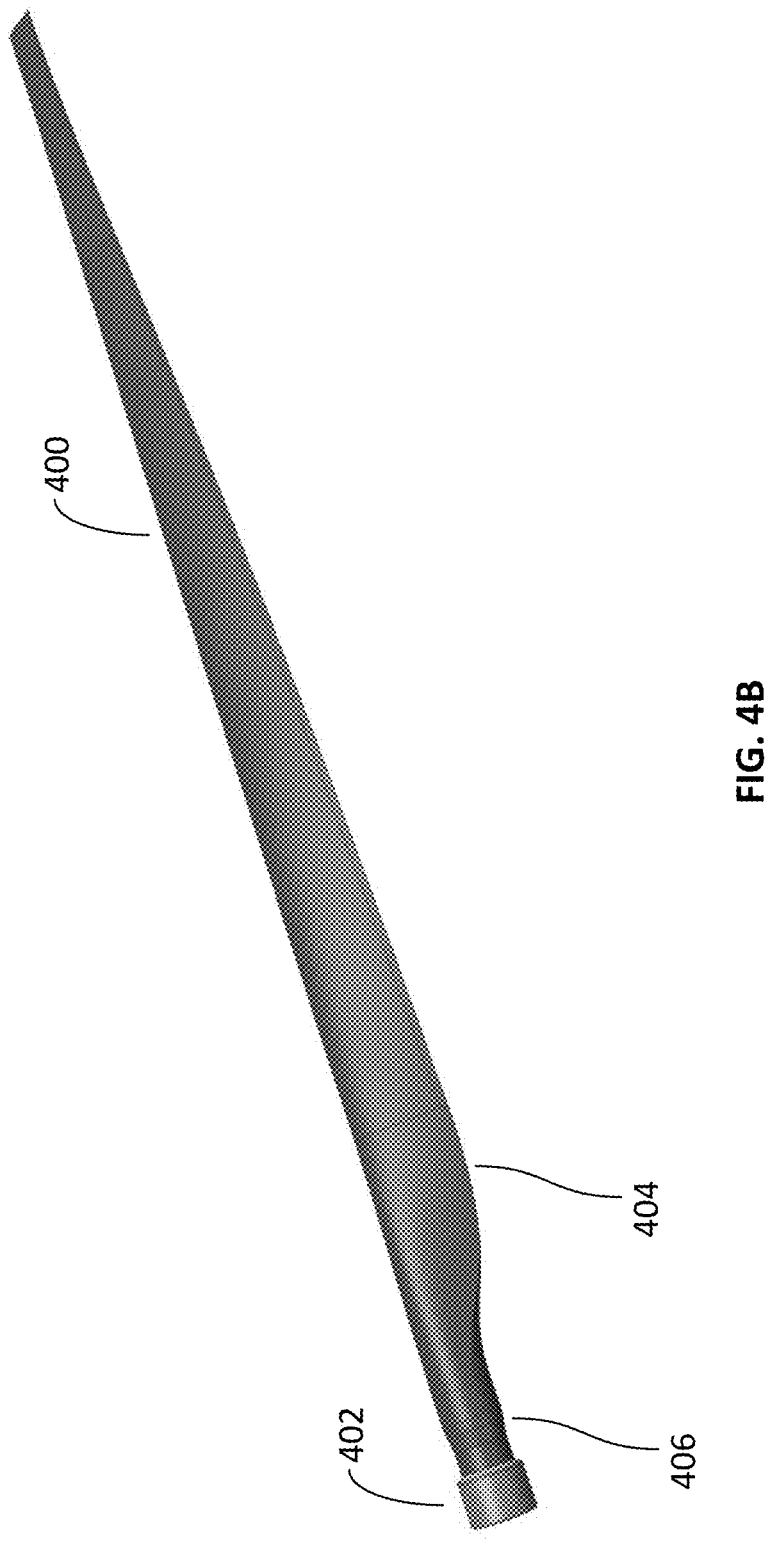
FIG. 4B is a diagram illustrating an embodiment of a detachable blade.

FIG. 4B is a diagram illustrating an embodiment of a detachable blade. In some embodiments, the detachable blade of FIG. 4B comprises one of the rotor blades shown attached to aircraft 100 in FIGS. 1, 2, and/or 4A. In the example shown, blade cuff 402 is attached to blade with forward edge 400 and back edge 404. In some embodiments, blade fibers are fabricated into blade span over shoulder 406 of blade cuff 402. Shoulder 406 is helpful in supporting a centrifugal force of the blade as it spins that is translated to the proprotor hub. In some embodiments, blade cuff 402 is designed to mate with spindle in a detachable manner using a bayonet style mounting.

Figure 5A:
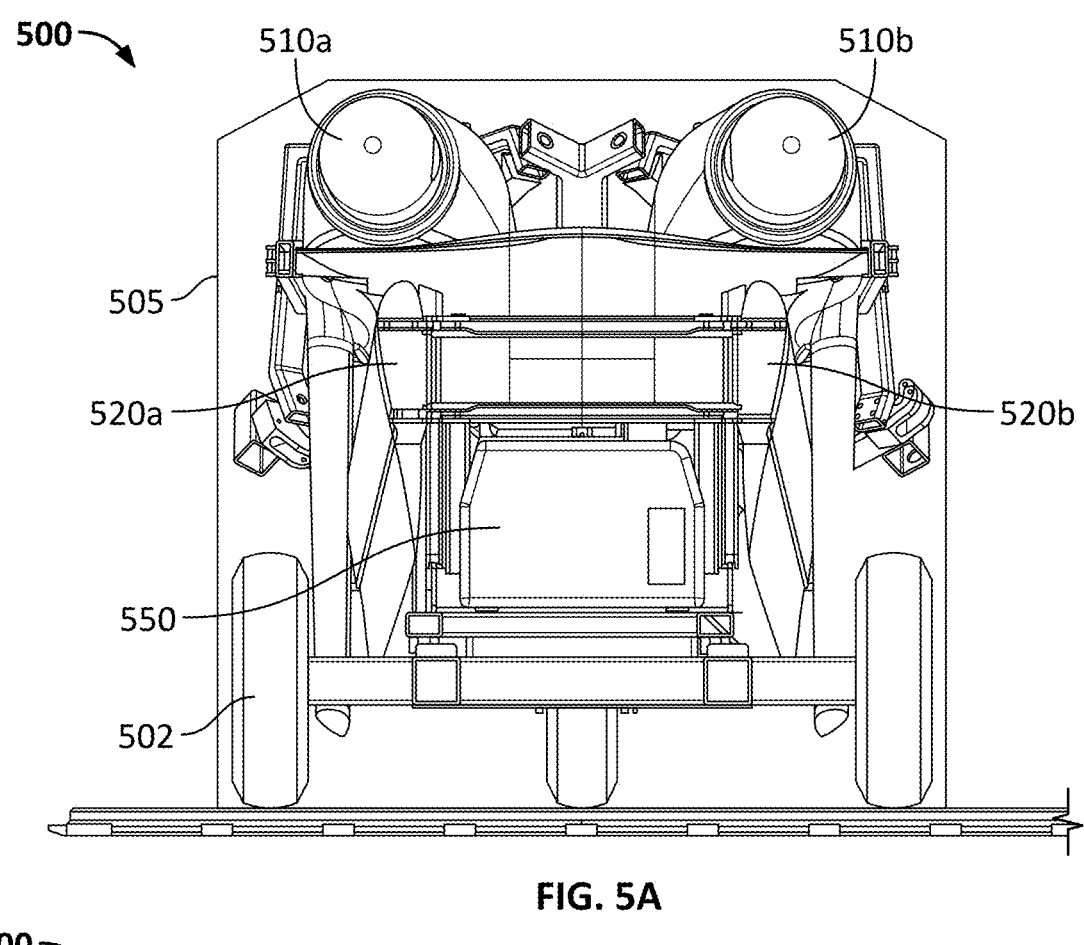
FIG. 5A is a front view of an aircraft in a disassembled state according to various embodiments.
Figure 5B:
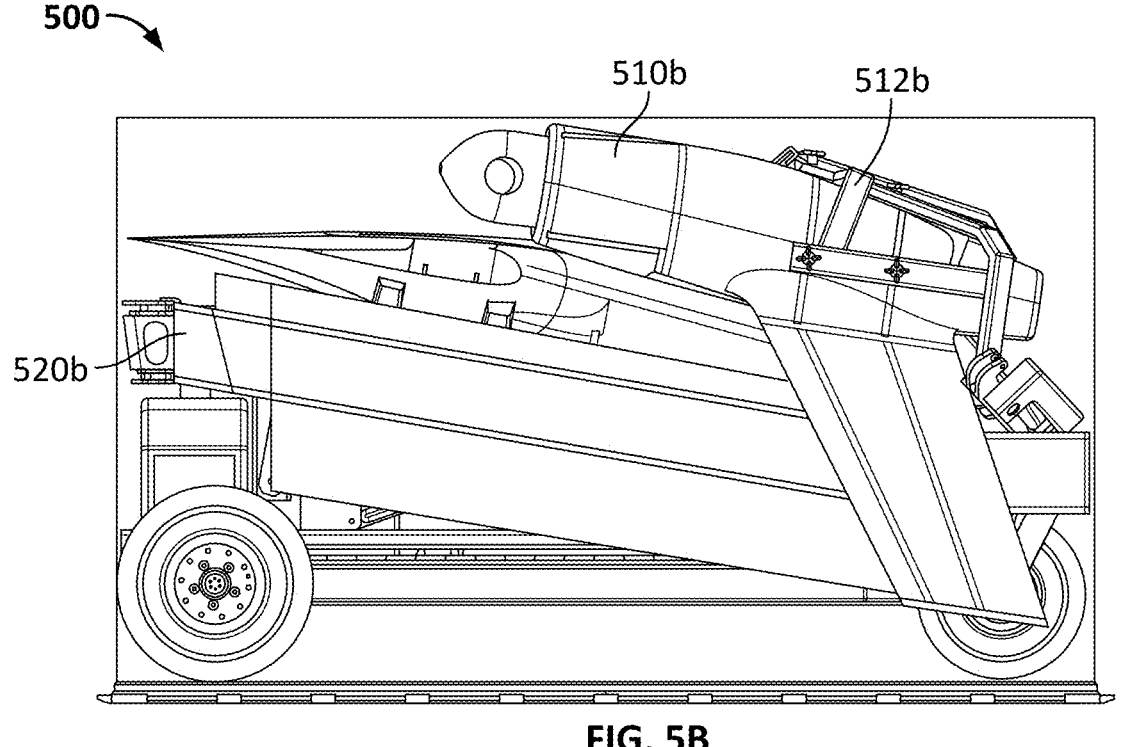
FIG. 5B is a side view of an aircraft in a disassembled state according to various embodiments.

FIGS. 5A and 5B are front view and side view diagrams of an aircraft in a disassembled state according to various embodiments. In the example shown, aircraft 500 is config-ured in a disassembled state (also referred to herein as a stowed state). The components for aircraft 500 are carried on cart 502. In some embodiments, the components collectively fit within envelope 505. As an example, dimensions of envelope 505 may be determined based on, or constrained by, dimensions of a cargo hold of a vessel in which aircraft 500 is to be transported.

As illustrated in FIGS. 5A and 5B, first nacelle 510*a* and second nacelle 510*b* are respectively detached from first wing 520*a* and second wing 520*b* and are placed/mounted on a nacelle support member (e.g., second nacelle support member 512*b*) of cart 502. In the disassembled state, first wing 520*a* and second wing 520*b* are folded around the center wing. First wing 520*a*, second wing 520*b*, and center wing may be respectively mounted/supported by support members of cart 502. The fuselage is folded from the center wing such that the fuselage occupies the space between the folded first wing 520*a* and the second wing 520*b*. During assembly, first nacelle 510*a* is connected to first wing 520*a* via a first nacelle support member on first wing 520*a*. Similarly, second nacelle 510*b* is connected to second wing 520*b* via a second nacelle support member on second wing 520*b*. As an example, the nacelle support members on the wings are inserted into the corresponding nacelles and the nacelles are mounted (e.g., bolted) to the wings.

In some embodiments, cart 502 comprises (e.g., supports) generator 550 for supplying electrical power. In some embodiments, a separate fuel tank (not shown in FIG. 5A or FIG. 5B) is used to supply aircraft 500 with fuel during assembly. In some embodiments, the fuel is pumped from the separate fuel tank to the fuselage fuel tank, to a first nacelle fuel tank, and/or to a second nacelle fuel tank. In some embodiments, cart 502 includes a fuel pump and a hose with connector/valve for interfacing with a fuel inlet for the fuselage, the first nacelle, and/or the second nacelle.

In some embodiments, cart 502 comprises support mem-bers that are controlled via motor or hydraulic piston to lift heavy components during assembly/disassembly. The hydraulic/motor support ensures that aircraft 500 is quickly assembled/disassembled and with less resources (e.g., human operators or other support equipment, such as a portable crane, etc.). In some embodiments, the time from drop shipment to take-off is within 30 minutes. Aircraft 500 can be assembled in about 10 minutes.

As illustrated in FIGS. 5A and 5B, aircraft 500 in a disassembled state is relatively compact relative to dimen-sions of the expanded aircraft 500 (e.g., in an assembled state).

According to various embodiments, the aircraft is designed to include interfaces between components that balance minimizing drag (e.g., having drag contributions less than a predefined draft threshold) and facilitating quick and easy assembly/disassembly. In some embodiments, cer-tain components are mounted via a hinge so that assembly/disassembly includes merely manipulating an interface bolt and rotating the component to transition between a disas-sembled state and an assembled state.

Figure 6A:
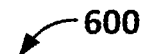
FIG. 6A is a diagram of an embodiment of an aircraft in a disassembled state.
Figure 6A:
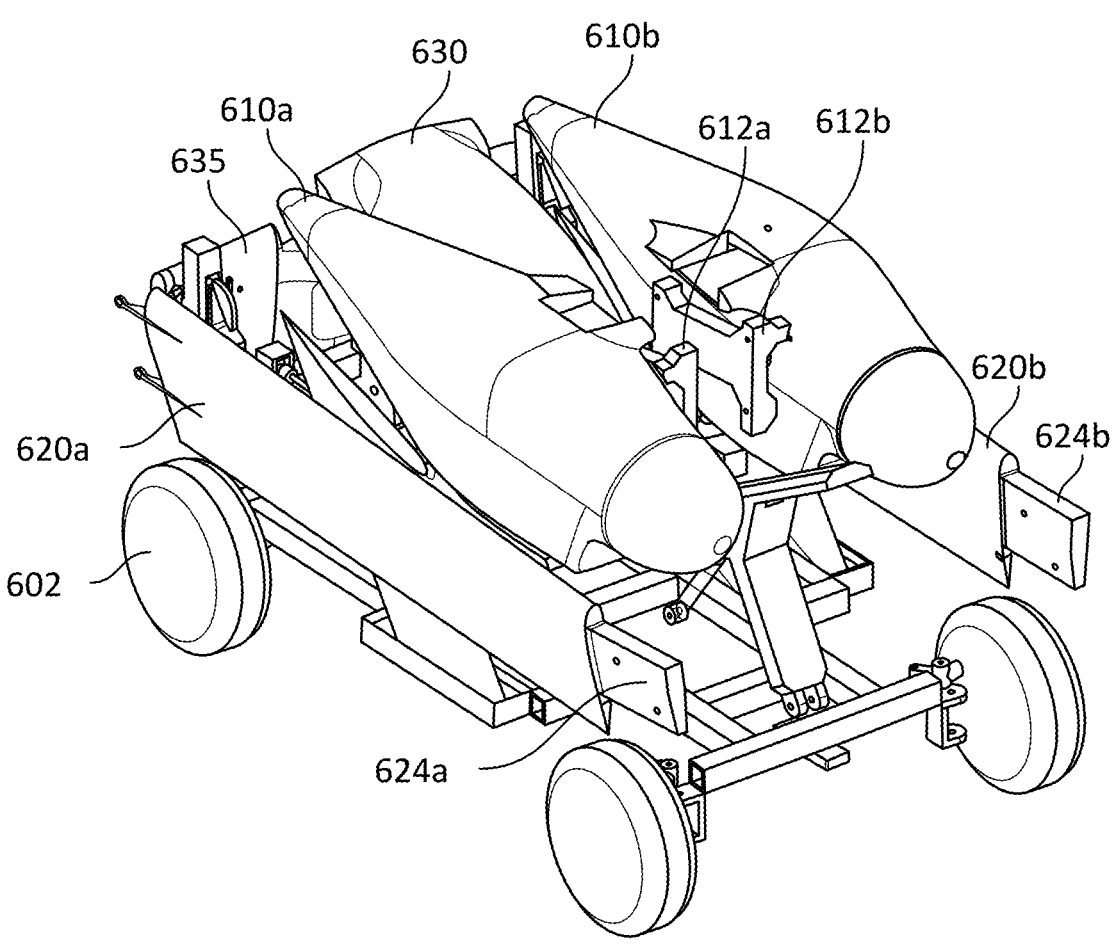

FIG. 6A is a diagram of an embodiment of an aircraft in a disassembled state. In the example shown, first nacelle 610*a* and second nacelle 610*b* are respectively detached from first wing 620*a* and second wing 620*b* and are placed/mounted on a nacelle support member (e.g., first nacelle support member 612*a* and second nacelle support member 612*b*) of cart 602. In the disassembled state, first wing 620*a* and second wing 620*b* are folded around center wing 635. First wing 620*a*, second wing 620*b*, and center wing 635 may be respectively mounted/supported by support mem-bers of cart 602. Fuselage 630 is folded from center wing 635 such that the fuselage occupies the space between the folded first wing 620*a* and the second wing 620*b*. During assembly, first nacelle 610*a* is connected to first wing 620*a* via first nacelle support member 624*a* on first wing 620*a*. Similarly, second nacelle 610*b* is connected to second wing 620*b* via second nacelle support member 624*b* on second wing 620*b*. As an example, the nacelle support members on the wings are inserted into the corresponding nacelles and the nacelles are mounted (e.g., bolted) to the wings.

In some embodiments, cart 602 comprises support mem-bers that are controlled via motor or hydraulic piston to lift heavy components during assembly/disassembly. The hydraulic/motor support ensures that aircraft 600 is quickly assembled/disassembled and with less resources (e.g., human operators or other support equipment, such as a portable crane, etc.). In some embodiments, the time from drop shipment to take-off is within 30 minutes. Aircraft 600 can be assembled in about 10 minutes.

As illustrated in FIG. 6A, aircraft 600 in a disassembled state is relatively compact relative to dimensions of the expanded aircraft 600 (e.g., in an assembled state).

According to various embodiments, the aircraft is designed to include interfaces between components that balance minimizing drag (e.g., have drag contributions less than a predefined draft threshold) and facilitating quick and easy assembly/disassembly. In some embodiments, certain components are mounted via a hinge so that assembly/disassembly includes merely manipulating an interface bolt and rotating the component to transition between a disassembled state and an assembled state.

In some embodiments, the fuel system includes connections (e.g., dry break connections that allow flow when connected and do not allow flow when not connected) that do not allow fuel to drain from the fuselage fuel tank, the first nacelle fuel tank, and/or the second nacelle fuel tank in the event that the aircraft is in a dissembled state with the fuel connections between the fuselage fuel tank, the first nacelle fuel tank, and/or the second nacelle fuel tank being not connected.

Figure 6B:
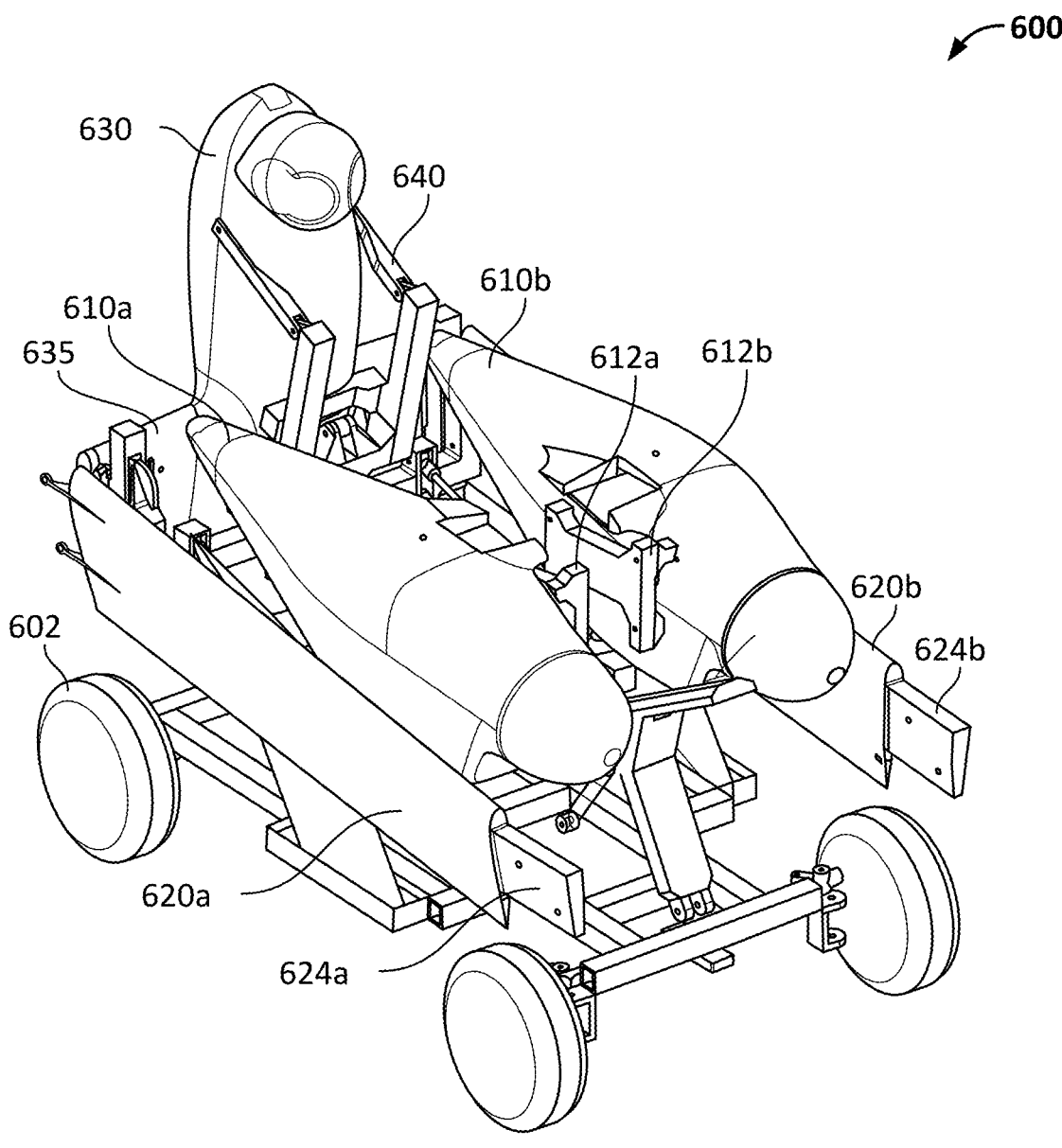
FIG. 6B and FIG. 6C are perspective views of an aircraft in a disassembled state and a partially assembled state according to various embodiments.
Figure 6C:
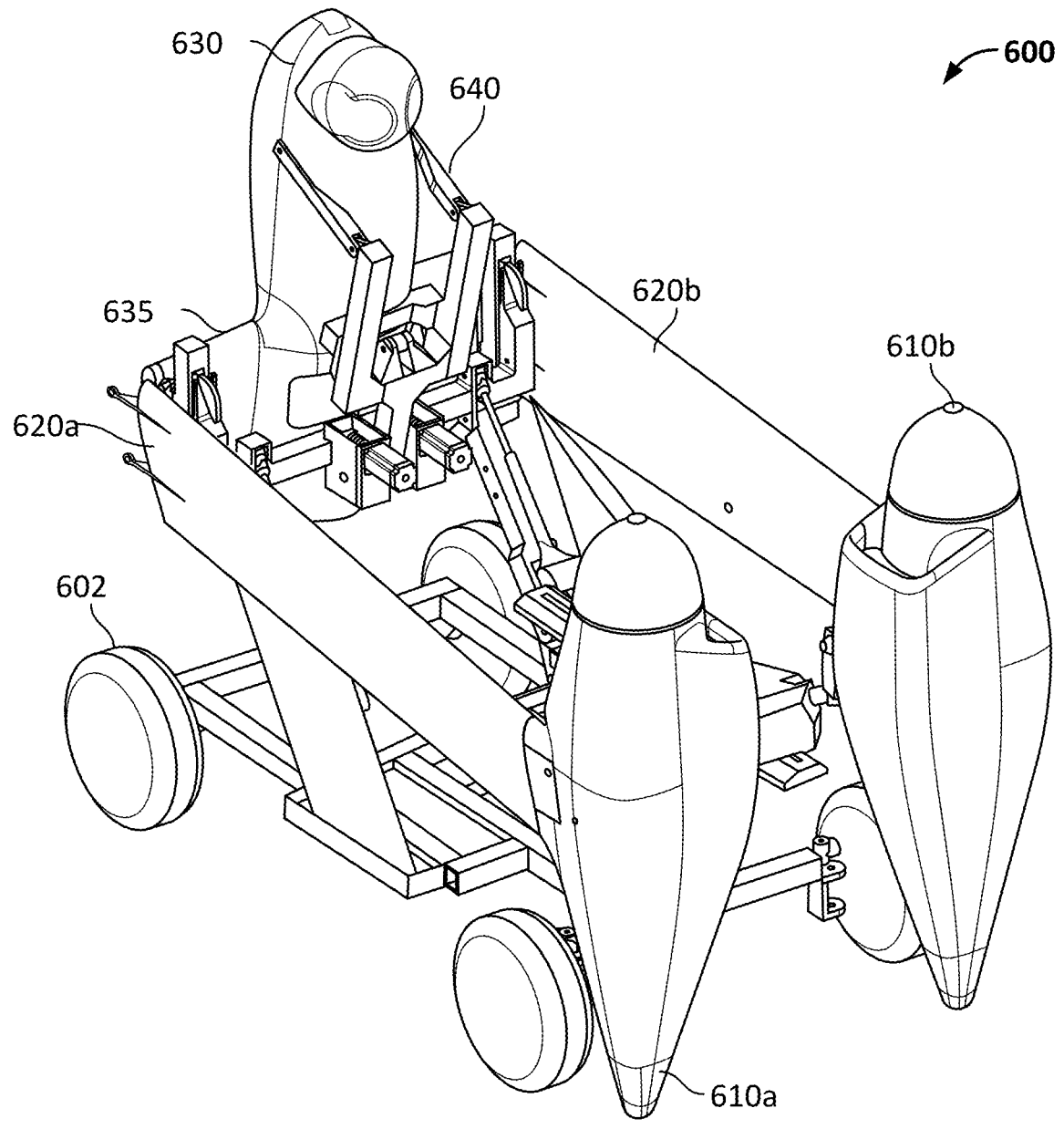

FIG. 6B and FIG. 6C are perspective views of an aircraft in a disassembled state and a partially assembled state according to various embodiments. In the examples shown in FIG. 6B of a state of aircraft 600, fuselage 630 is shown rotated upwards (e.g., using a hinge of cart 602 to pivot fuselage 630 which is moved using support member 640 to a fuselage assembled state where fuselage 630 is coupled to center wing 635). Fuselage 630 is transitioned from a disassembled state in which fuselage 630 rests in the space defined by folded first wing 620a and second wing 620b to an assembled state in which fuselage 630 engages with center wing 635 and extends substantially vertically from the ground. In some embodiments, assembly of fuselage 630 includes rotating fuselage around an axis defined by a hinge mount that connects fuselage 630 and center wing 635. In response to fuselage 630 being rotated upwards and transitioned to an assembled state, fuselage 630 is fixedly mounted to center wing 635, such as by inserting/tightening interface bolts. In some embodiments, first nacelle 610a and second nacelle 610b are respectively mounted on a nacelle support member (e.g., first nacelle support member 612a and second nacelle support member 612b) to cart 602.

In the example shown in FIG. 6C, first wing 620a and second wing 620b are moved (e.g., raised using actuators) to mount to nacelle support members with first nacelle 610a and second nacelle 610b, respectively. In some embodiments, moving first wing 620a and second wing 620b for alignment includes raising fuselage 630 and/or center wing 635, such as by actuating movement of support member 640. As fuselage 630 and center wing 635 are moved, first wing 620a and second wing 620b are moved in turn.

Figure 6D:
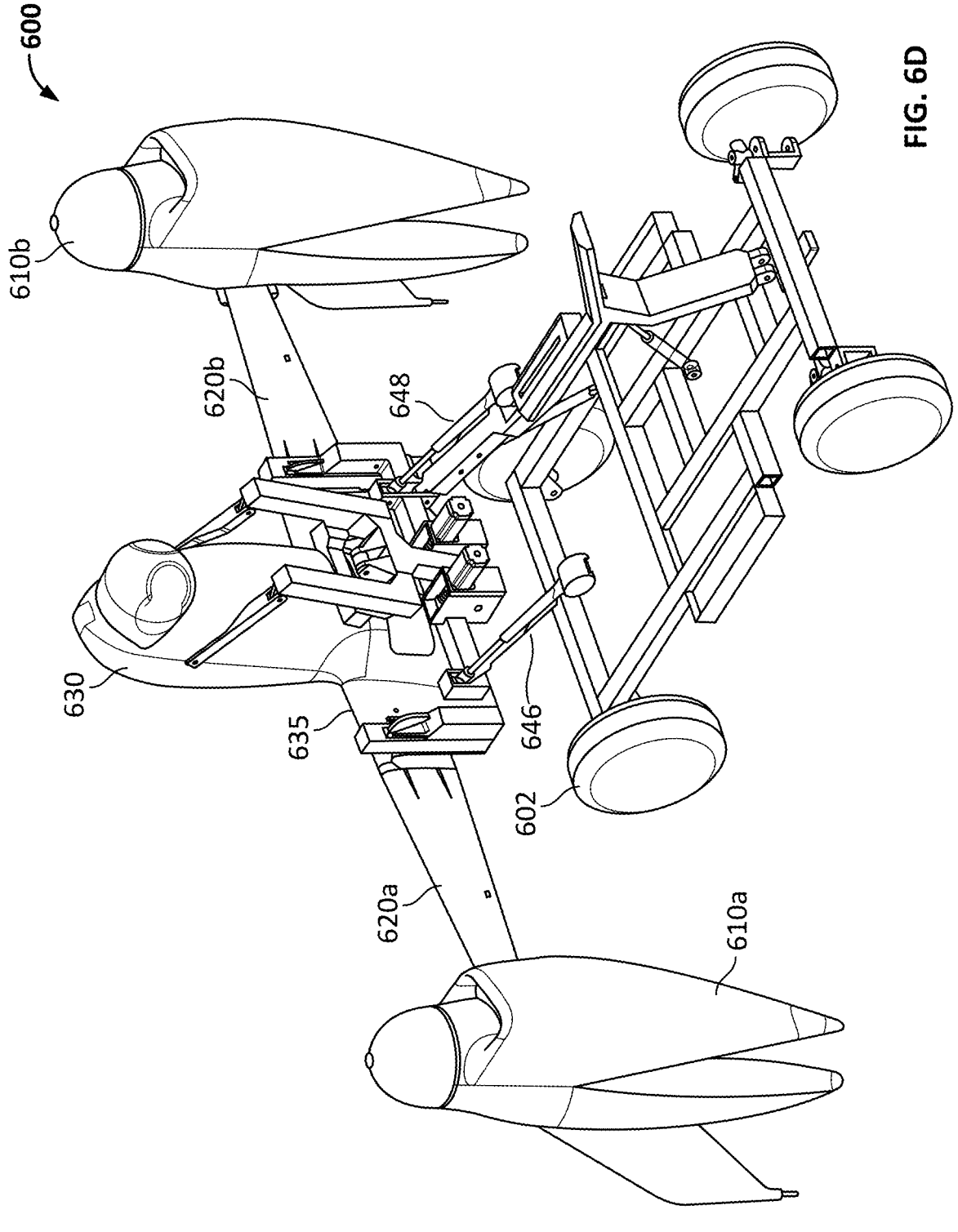
FIG. 6D is a perspective view of an aircraft in a partially assembled state according to various embodiments.

FIG. 6D is a perspective view of an aircraft in a partially assembled state according to various embodiments. In the example shown in FIG. 6D of a state of aircraft 600, the wings are extended for fixedly mounting the wings to the center wing. In response to the nacelles (e.g., first nacelle 610a and second nacelle 610b) being fixedly mounted to the wings (e.g., first wing 620a and second wing 620b), the wings are moved to the position at which the wings are to be fixed to center wing 635. In some embodiments, the wings are respectively connected to center wing 635 via a hinge. Accordingly, the wings are rotated around the axes respectively defined by the hinges until the wings are level (or substantially level) with center wing 635. Mounting the wings to center wing 635 may include configuring an attachment mechanism, such as an interface bolt, to fixedly mount the wings to the center wing. In some embodiments, the winglets (e.g., winglet 615) are attached using a ball spring pin and/or a spring-loaded locking pin. Actuator 646 and actuator 648 are used to elevate aircraft 600 as part of an assembly sequence.

Figure 6E:
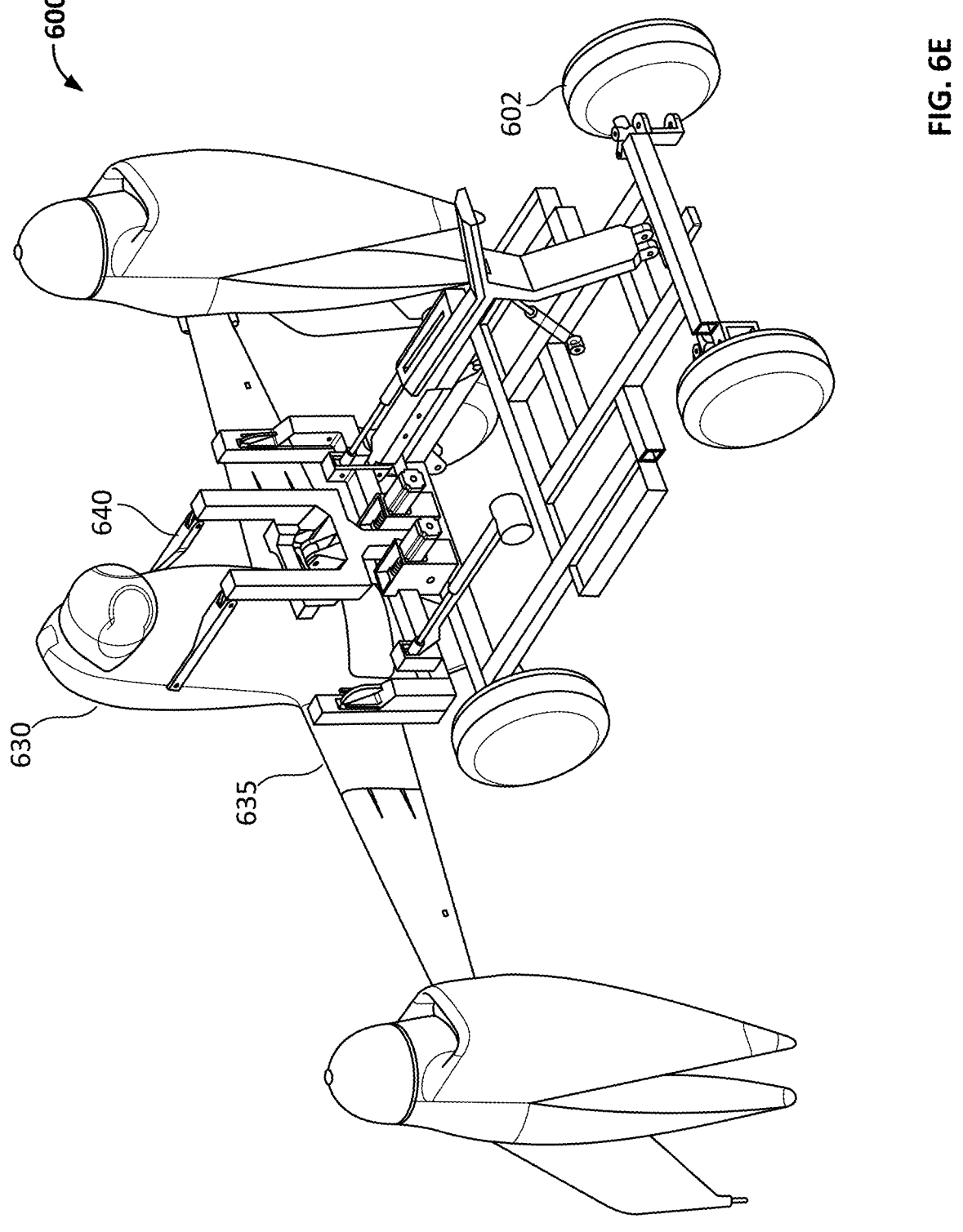
FIG. 6E is a diagram illustrating an embodiment of a collapsible aircraft.

FIG. 6E is a diagram illustrating an embodiment of a collapsible aircraft. In the example shown in FIG. 6E of a state of aircraft 600 when aircraft 600 is lowered to the ground. In some embodiments, lowering aircraft 600 to the ground includes actuating one or more actuation mechanisms coupled to support members of cart 602. For example, actuating region 644 is actuated to cause center support member 640 to be lowered until feet on the landing support members are resting on the ground. In response to aircraft 600 being resting in a landed position on the ground, aircraft 600 is detached from various support members. For example, center support member 640 is detached from fuselage 630 and/or center wing 635.

Figure 6F:
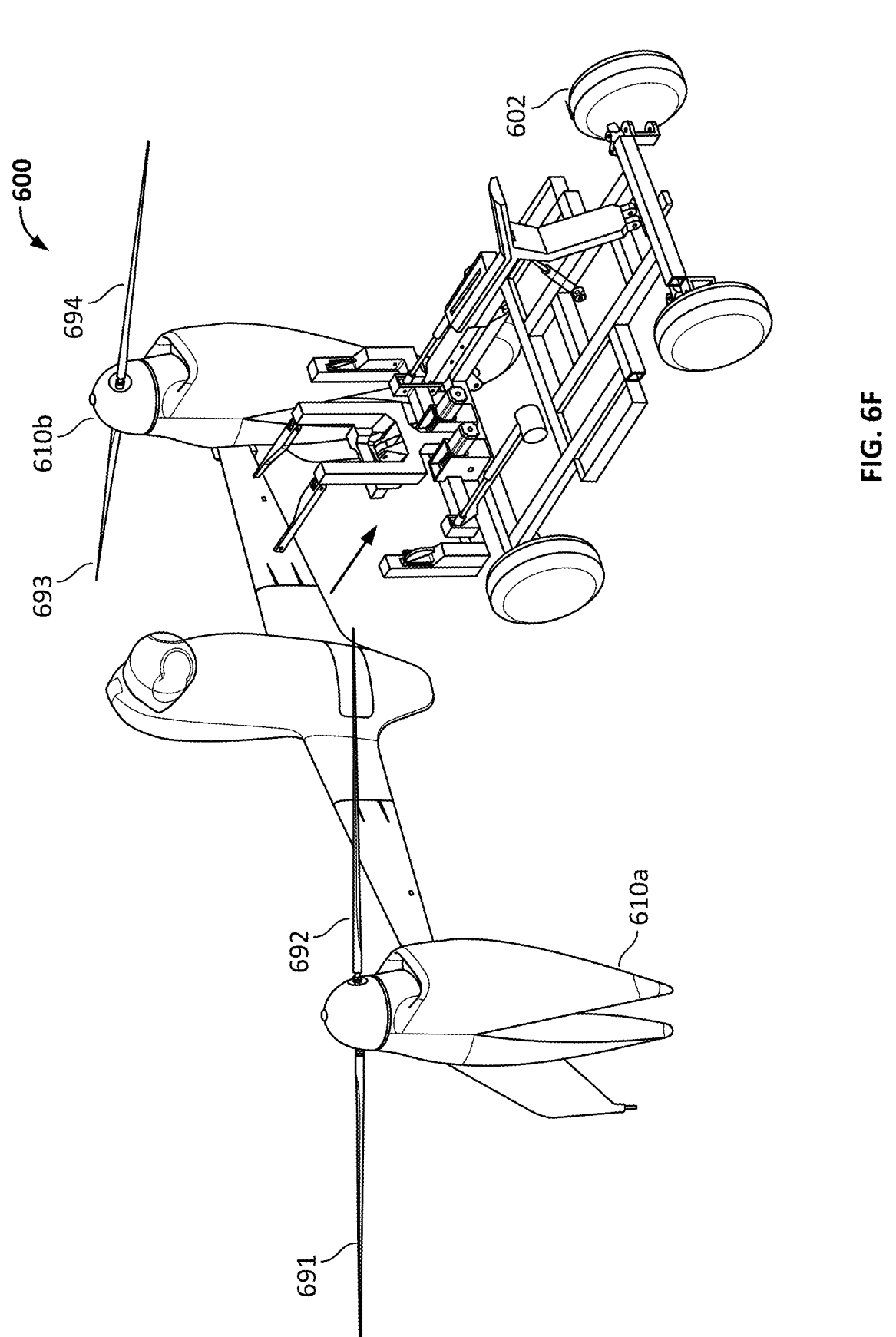
FIG. 6F is a diagram illustrating an embodiment of a collapsible aircraft.

FIG. 6F is a diagram illustrating an embodiment of a collapsible aircraft. In the example shown in FIG. 6F of a state of aircraft 600 in which cart 602 is removed, such as by pulling cart away from aircraft 600. In the example shown, rotor blades (e.g., rotor blade 691, rotor blade 692, rotor blade 693, and rotor blade 694) are connected to the proprotors comprised in first nacelle 610a and second nacelle 610b. As illustrated, aircraft 600 comprises two rotor blades on each proprotor. In some embodiments, the rotor blades are installed to the proprotor by connecting a rotor blade assembly comprising a rotor blade and a blade cuff that is configured to enable the rotor blade assembly to be detachably connected to the proprotor. In some embodiments, the rotor blades are stowed during storage on cart 602 during transport and removed and installed on to spindles of the rotor cones of first nacelle 610a and second nacelle 610b. In the case of an aircraft propelled using internal combustion engines, the fuel reservoirs in aircraft 600 are filled with fuel, and aircraft 600 is set ready for deployment. In response to aircraft 600 being set ready for deployment, aircraft 600 may be controlled to initiate a take-off sequence to vertically take off from the location at which aircraft 600 was assembled.

Figure 7A:
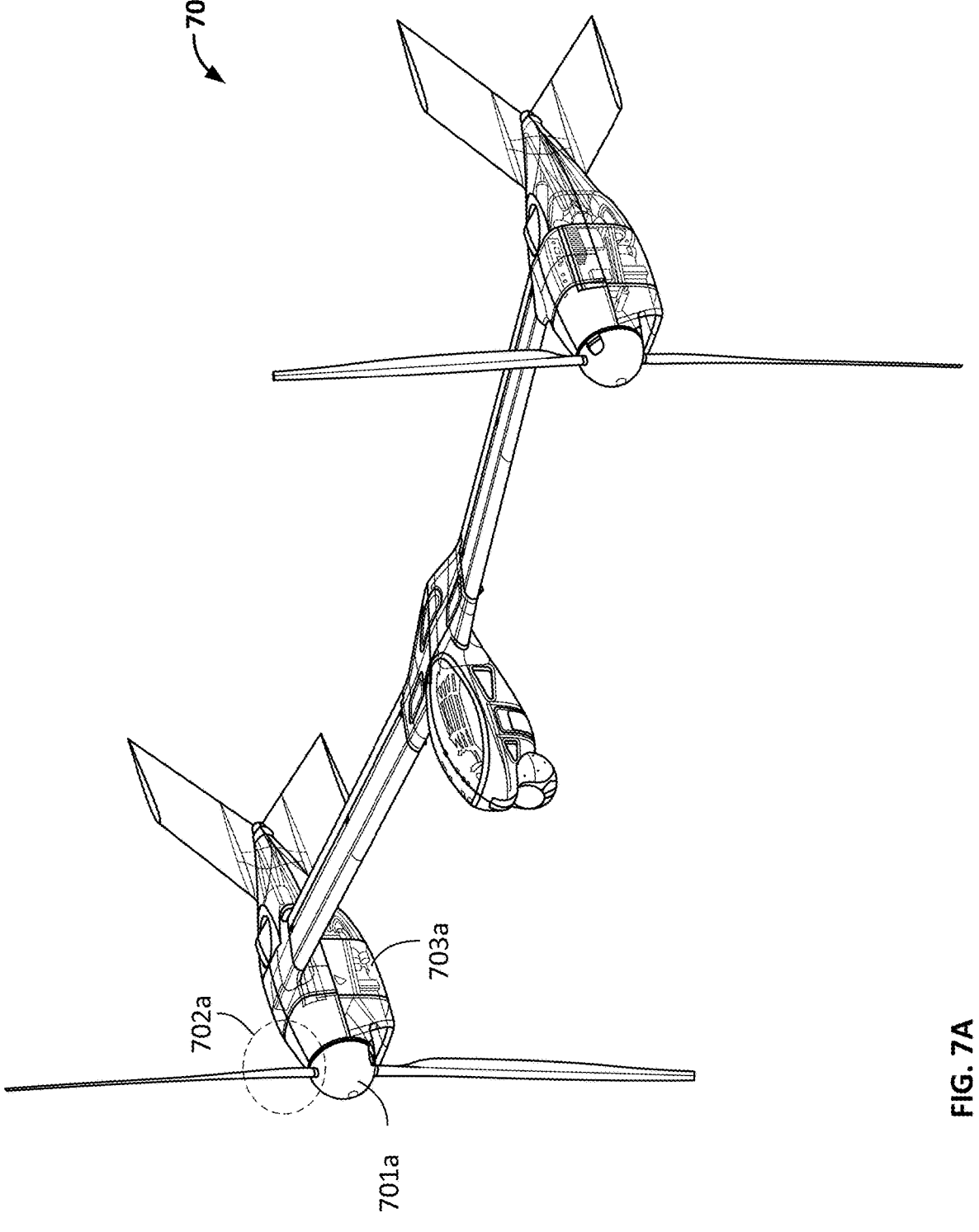
FIG. 7A is a diagram of an aircraft according to various embodiments.

FIG. 7A is a diagram of an aircraft according to various embodiments. In the example shown, first nacelle 703a of aircraft 700 includes an engine with rotating cone 701a that includes one or more joints (e.g., blade-nacelle mount 702a) between the engine of first nacelle 703a via rotating cone 701a.

FIG. 7B-7G is a diagram of a connection between a blade and a nacelle of an aircraft according to various embodiments. are diagrams of a connection between a blade and an engine of a nacelle of an aircraft according to various embodiments. In some embodiments, blade-nacelle mount 702a of FIGS. 7B-7G are details of blade-nacelle mount 702a of FIG. 7A. In the example shown, blade-nacelle mount 702a connects proprotor blades (e.g., proprotor blade 742a) to the proprotor (e.g., proprotor hub 741a in rotating cone of the engine of a nacelle). In some embodiments, blade-nacelle mount 702a is configured to allow for a toolless assembly/disassembly. For example, a human operator may install the proprotor blades to the proprotor by hand.

According to various embodiments, proprotor blade 742a is comprised in a rotor blade assembly 770a. Rotor blade assembly 770a comprises proprotor blade 742a and blade cuff 772a. Proprotor blade 742a is configured to facilitate propulsion of the aircraft in vertical take-off and landing orientations and a horizontal flight orientation. Blade cuff 772a is configured to support proprotor blade 742a and to connect to the proprotor. Blade cuff 772a is configured to be detachably connected to the proprotor in a manner that the connection can be made quickly with ease.

In the example shown, blade cuff 772a comprises a distal end 775a, shoulder 777a, and connector 779a on the proximal end of blade cuff 772a. The distal end 775a is integrally connected to proprotor blade 742a to provide a seamless profile. The distal end 775*a* may be integrally connected to proprotor blade 742*a* based on curing resin in an injection mold cavity that comprises both proprotor blade 742*a* and blade cuff 772*a*. The distal end 775*a* is wider (e.g., has a larger diameter) than area before shoulder 777*a*. Accordingly, fibers can be laid up to extend over shoulder 777*a* to a location on proprotor blade 742*a* in order to provide additional support between proprotor blade 742*a* and blade cuff 772*a*.

According to various embodiments, blade-nacelle mount 702*a* comprises a push and twist connector (e.g., a connector that enables a quick detachable connection between connector 779*a* and the proprotor). The push and twist connector enables the proprotor to be mounted to the nacelle (e.g., to the proprotor, etc.) without any additional tools. In some embodiments, the proprotor has one or more notches located on the internal circumference of the cavity formed at the proximal end of proprotor. The proprotor hub (or the nacelle) has one or more ridges disposed on the outer circumference of the male end of the hub connector interface. Further, the proprotor hub includes a set of gaps between the ridges on the hub connector interface such that no single ridge is disposed along the entire outer circumference of proprotor hub 741*a*. Proprotor blade 742*a* is installed by aligning the notches on the proprotor blade with corresponding gaps in the ridges of proprotor hub 741*a* and pushing proprotor blade 742*a* such that the notches pass (e.g., in insertion direction 743*a*) corresponding ridges on proprotor hub 741*a*. In response to the proprotor blade 742*a* being sufficiently pushed to provide clearance between the notches on proprotor blade 742*a* and a corresponding ridge passed which the notch was inserted, proprotor blade 742*a* is twisted (e.g., in direction of 744*a*) such that the notches on proprotor blade 742*a* are no longer aligned with the set of corresponding gaps in the ridges of proprotor hub 741*a*. Proprotor hub 741*a* comprises a biasing structure (e.g., a spring) that pushes proprotor blade 742*a* in a direction opposite the insertion direction, thereby causing proprotor blade 742*a* to be connected to proprotor hub 741*a* until disassembly when proprotor blade 742*a* is pushed in the insertion direction (e.g., insertion direction 743*a*) and twisted to re-align the notches with the set of gaps to allow for extraction of proprotor blade 742*a*.

Figure 7B:
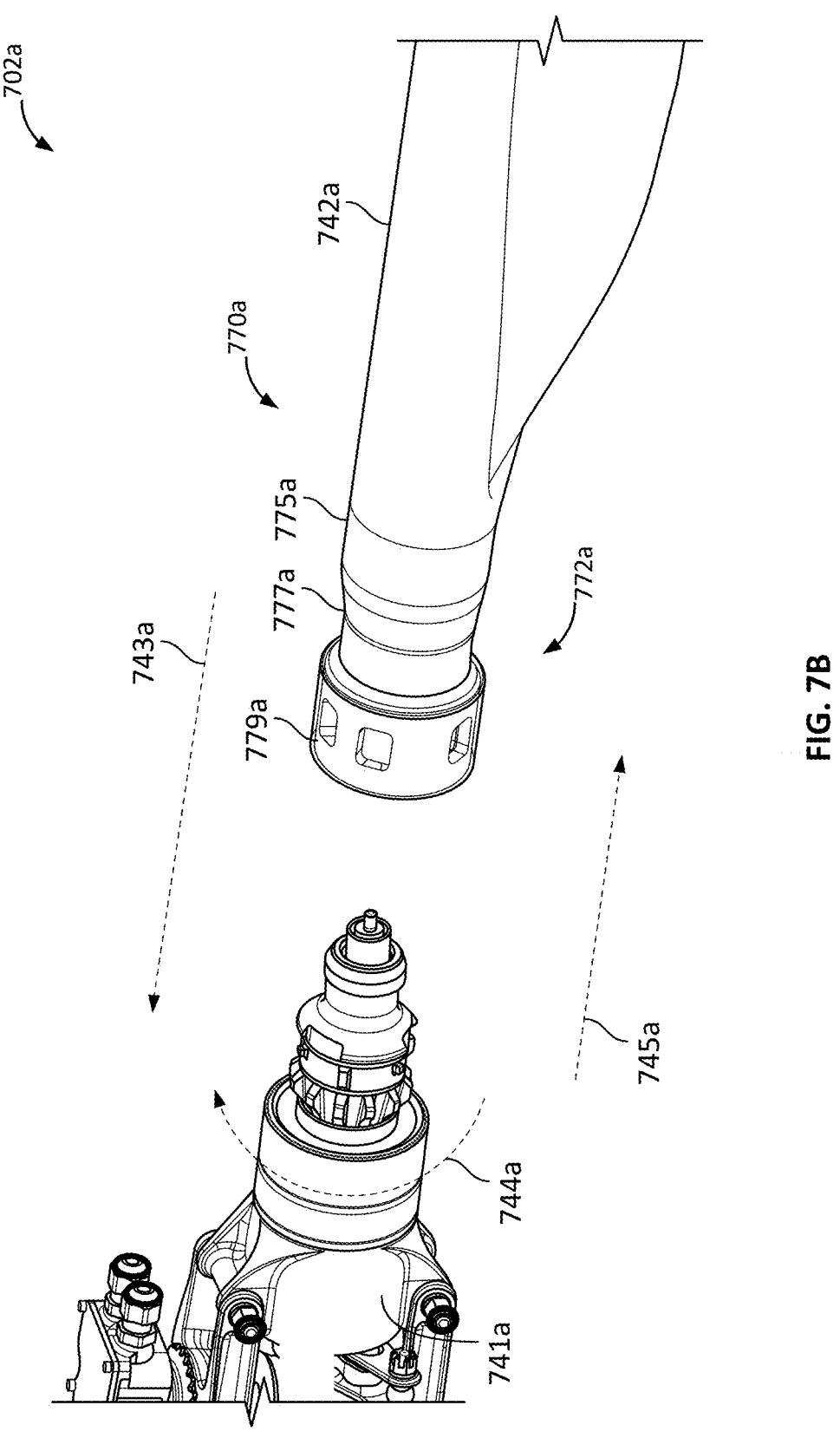
FIGS. 7B-7G are diagrams of a connection between a blade and a nacelle of an aircraft according to various embodiments.

As illustrated in FIG. 7B, the sequence of steps for installing proprotor blade 742*a* to the proprotor includes pushing proprotor blade 742*a* in the push preload direction 743*a* to engage a proximal end of proprotor blade 742*a* with proprotor hub 741*a*. In response to proprotor blade 742*a* (e.g., connector 779*a* of blade cuff 772*a* that supports proprotor blade 742*a*) being moved to a position at which a distal end of proprotor hub 741*a* is engaged with proprotor blade 742*a* (e.g., a distal end of proprotor hub 741*a* being within a cavity defined by the proximal end of proprotor blade 742*a*), proprotor blade 742*a* is twisted in twist direction 744*a*, which is defined by an axis that is perpendicular to the length of proprotor blade 742*a* and/or proprotor hub 741*a*. After proprotor blade 742*a* is sufficiently rotated around twist direction 744*a* (e.g., proprotor blade 742*a* is configured in a clocking feature restrain position), the proprotor blade 742*a* is released by the installer (e.g., a human operator) and a biasing spring pushes proprotor blade 742*a* out along spring out direction 745*a* (e.g., in a direction opposite push preload direction 743*a*).

Figure 7C:
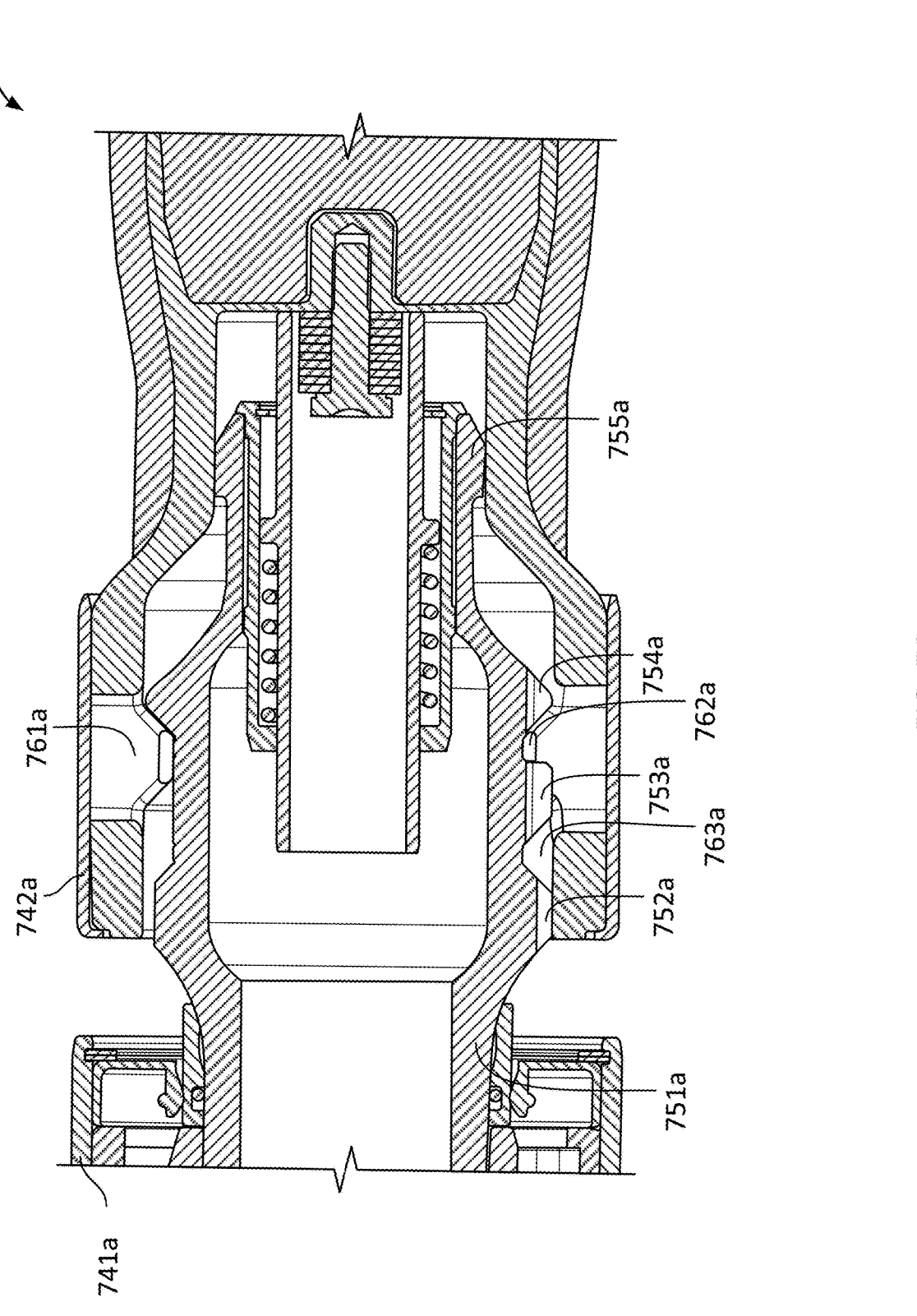

As illustrated in FIG. 7C, proprotor blade 742*a* has a set of notches (e.g., notches 761*a*, 762*a*, and 763*a*) disposed on the internal circumference of the cavity defined by proprotor blade 742*a*. The notches are protrusions located on a part of the internal circumference but do not stretch the entire internal circumference. After insertion of proprotor blade 742*a* such that the set of notches is aligned corresponding gaps in ridges of proprotor hub structure 751*a* of proprotor hub 741*a*. The proprotor blade 742*a* is twisted to cause mis-alignment between the set of notches and corresponding gaps in the ridges, and proprotor hub 741*a* causes a biasing force to be applied to proprotor blade 742*a* so that the set of notches engage parts of the ridges, thereby preventing removal of proprotor blade 742*a*. Proprotor hub 741*a* comprises hub structure 751*a* that includes a set of ridges on the outer circumference of hub structure 751*a* (e.g., clocking feature contact feature 753*a*, 754*a*, and moment contact feature 755*a*).

Figures 7D, 7E:
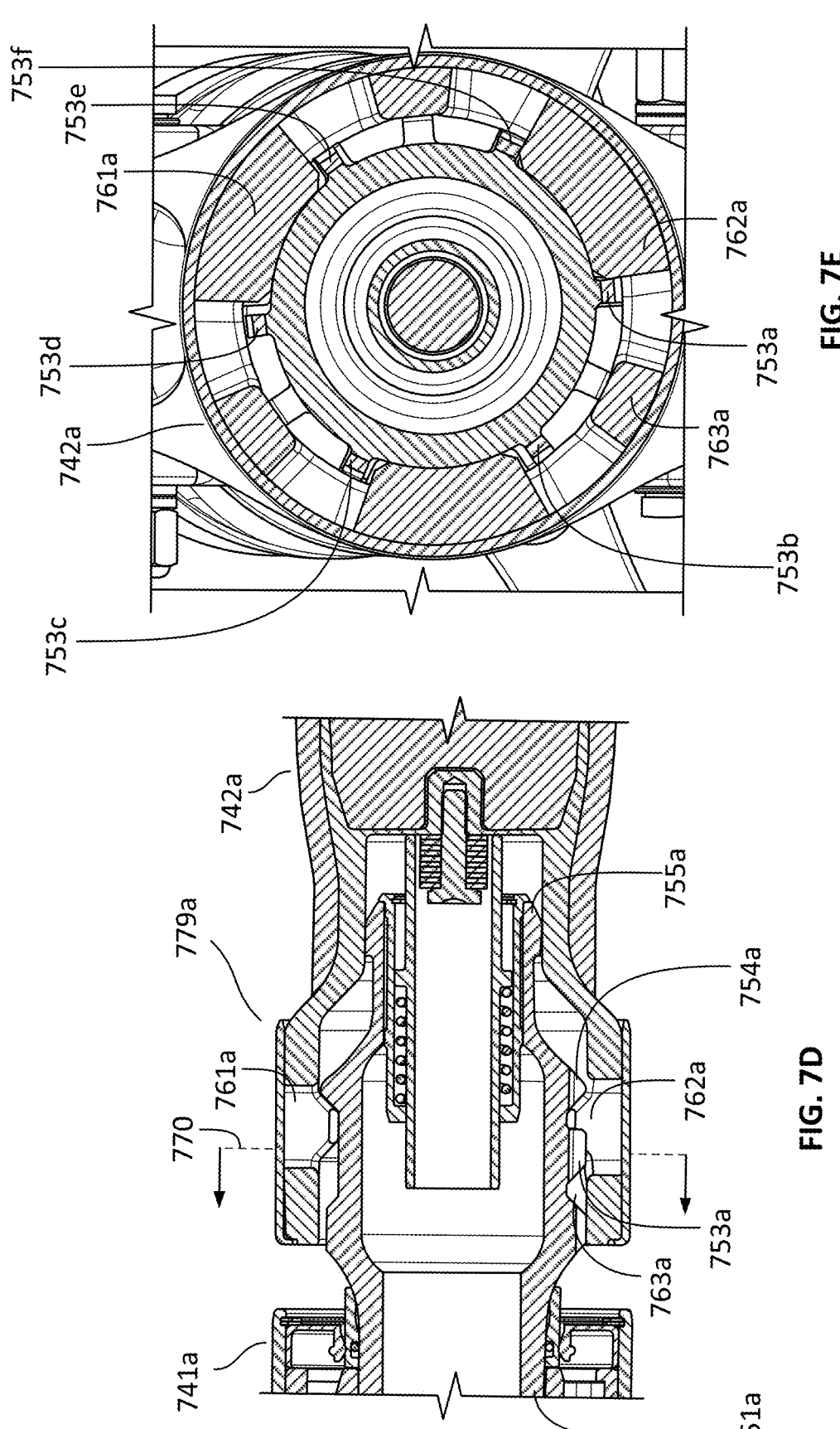
Figures 7F, 7G:
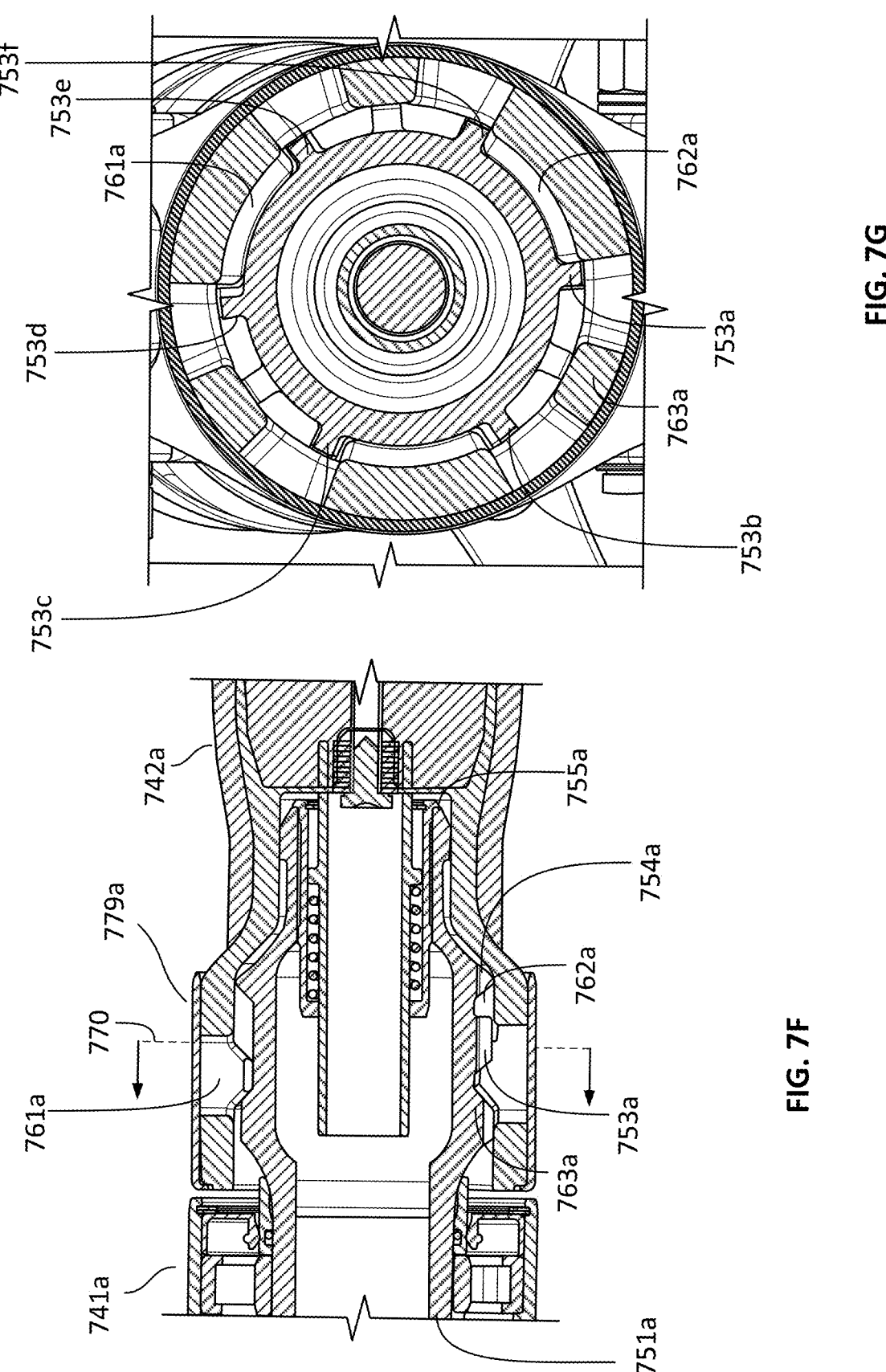

A cross-sectional view of blade-nacelle mount 702*a* is provided in FIGS. 7D-7G. FIGS. 7D and 7E illustrate a cross section when proprotor blade 742*a* is installed. Conversely, FIGS. 7F and 7G illustrate a cross section when proprotor blade 742*a* (e.g., connector 779*a*) is pushed in the insertion direction during disassembly. Cross section 770 is taken with respect to blade-nacelle mount 702*a* and provided in FIGS. 7E and 7G.

As illustrated in FIG. 7D, proprotor blade 742*a* has a set of notches (e.g., notches 761*a*, 762*a*, and 763*a*) disposed on the internal circumference of the cavity defined by proprotor blade 742*a*. The notches are protrusions located on a part of the internal circumference but do not stretch the entire internal circumference. After insertion of proprotor blade 742*a*, the set of notches is aligned corresponding gaps in ridges of proprotor hub structure 751*a* of proprotor hub 741*a*. The proprotor blade 742*a* is twisted to cause mis-alignment between the set of notches and corresponding gaps in the ridges, and proprotor hub 741*a* causes a biasing force to be applied to proprotor blade 742*a* so that the set of notches engage parts of the ridges, thereby preventing removal of proprotor blade 742*a*. Proprotor hub 741*a* comprises hub structure 751*a* that includes a set of ridges on the outer circumference of hub structure 751*a* (e.g., clocking feature contact features 753*a*, 754*a*, and moment contact feature 755*a*).

As illustrated in FIG. 7E, the notches on the inside circumference of proprotor blade 742*a* (e.g., notch 761*a*, notch 762*a*, and notch 763*a* on the inside of a connector of blade cuff that supports proprotor blade 742*a*) and the ridges (e.g., contact feature 753*a*, 753*b*, 753*c*, 753*d*, 753*e*, and 753*f*) on the outer circumference of proprotor hub are disposed at various positions along that the corresponding circumferences and relatively small subset of positions of proprotor blade 742*a* relative to proprotor hub provide alignment with corresponding notches (e.g., notch 761*a*, notch 762*a*, and notch 763*a*) and gaps in the ridges. For example, as shown in FIG. 7E, the notches (e.g., notch 761*a*, notch 762*a*, and notch 763*a*) restrain the position of the proprotor blade 742*a* and proprotor hub. For example, the engagement between the ridges and the notches restrains the position of proprotor blade 742*a* relative to proprotor hub to preventing proprotor blade 742*a* to rotate relative to proprotor hub.

As illustrated in FIG. 7F, proprotor blade 742*a* has a set of notches (e.g., notches 761*a*, 762*a*, and 763*a*) disposed on the internal circumference of the cavity defined by proprotor blade 742*a*. The notches are protrusions located on a part of the internal circumference but do not stretch the entire internal circumference. After insertion of proprotor blade 742*a*, the set of notches is aligned corresponding gaps in ridges of proprotor hub structure 751*a* of proprotor hub 741*a*. The proprotor blade 742*a* is twisted to cause mis-alignment between the set of notches and corresponding gaps in the ridges, and proprotor hub 741a causes a biasing force to be applied to proprotor blade 742a so that the set of notches engage parts of the ridges, thereby preventing removal of proprotor blade 742a. Proprotor hub 741a comprises hub structure 751a that includes a set of ridges on the outer circumference of hub structure 751a (e.g., clocking feature contact features 753a, 754a, and moment contact feature 755a).

As illustrated in FIG. 7G, the notches on the inside circumference of proprotor blade 742a (e.g., notch 761a, notch 762a, and notch 763a on the inside of a connector of blade cuff that supports proprotor blade 742a) and the ridges (e.g., contact feature 753a, 753b, 753c, 753d, 753e, and 753f) on the outer circumference of proprotor hub are disposed at various positions along that the corresponding circumferences and relatively small subset of positions of proprotor blade 742a relative to proprotor hub provide alignment with corresponding notches (e.g., notch 761a, notch 762a, and notch 763a) and gaps in the ridges. When proprotor blade 742a is pushed in the insertion direction (e.g., towards proprotor hub 741a), the notches on the internal circumference of proprotor blade 742 are not engaged with the ridges on the outer circumference of proprotor hub 741a. For example, clocking feature contact feature 753a is not engaged with notch 762a, thereby allowing proprotor blade 742a to be twisted and pulled out in the removal direction.

Figure 8A:
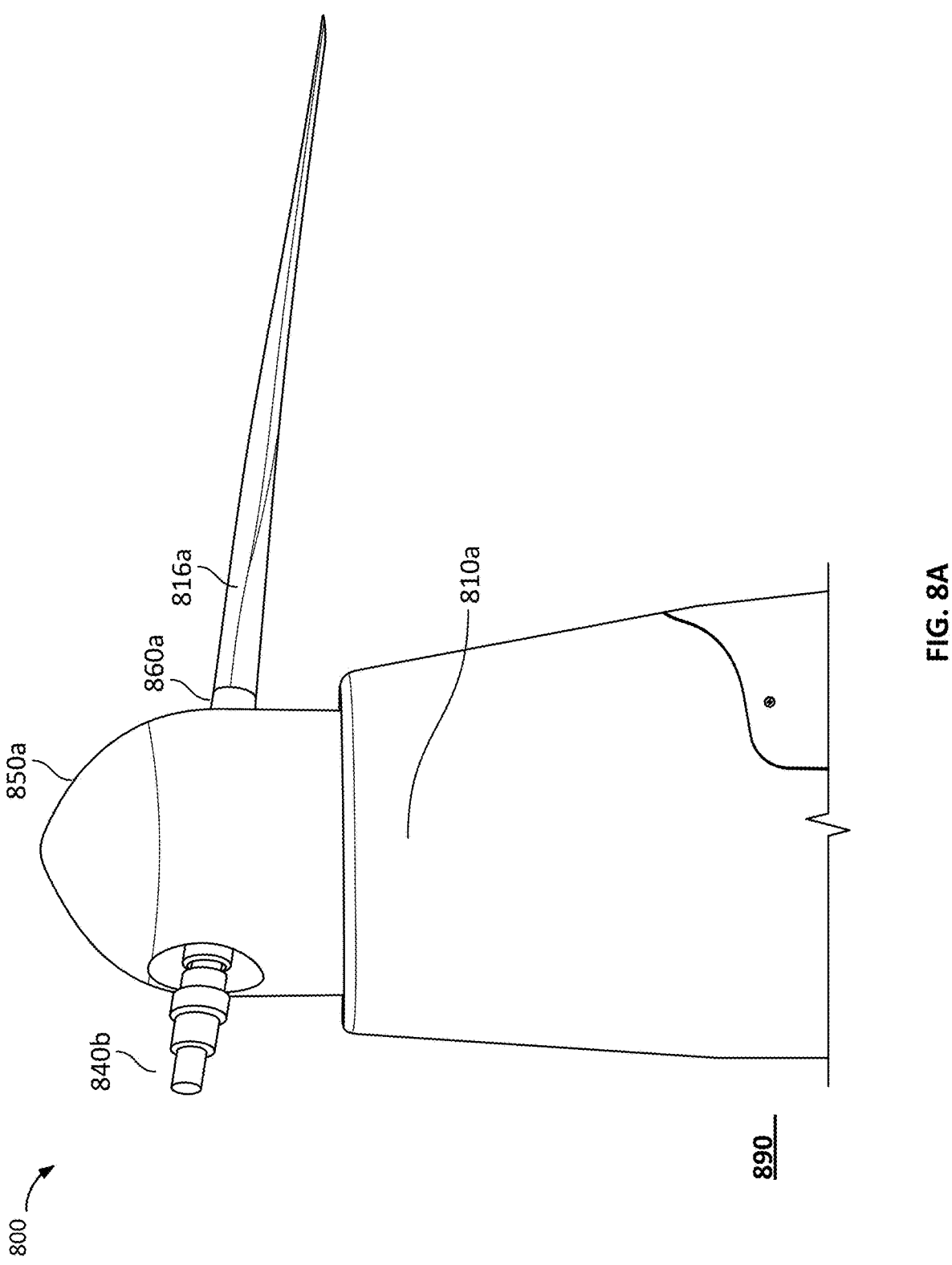
FIGS. 8A-8B are diagrams of a step in a sequence for assembling an aircraft to include rotor blades according to various embodiments.
Figure 8B:
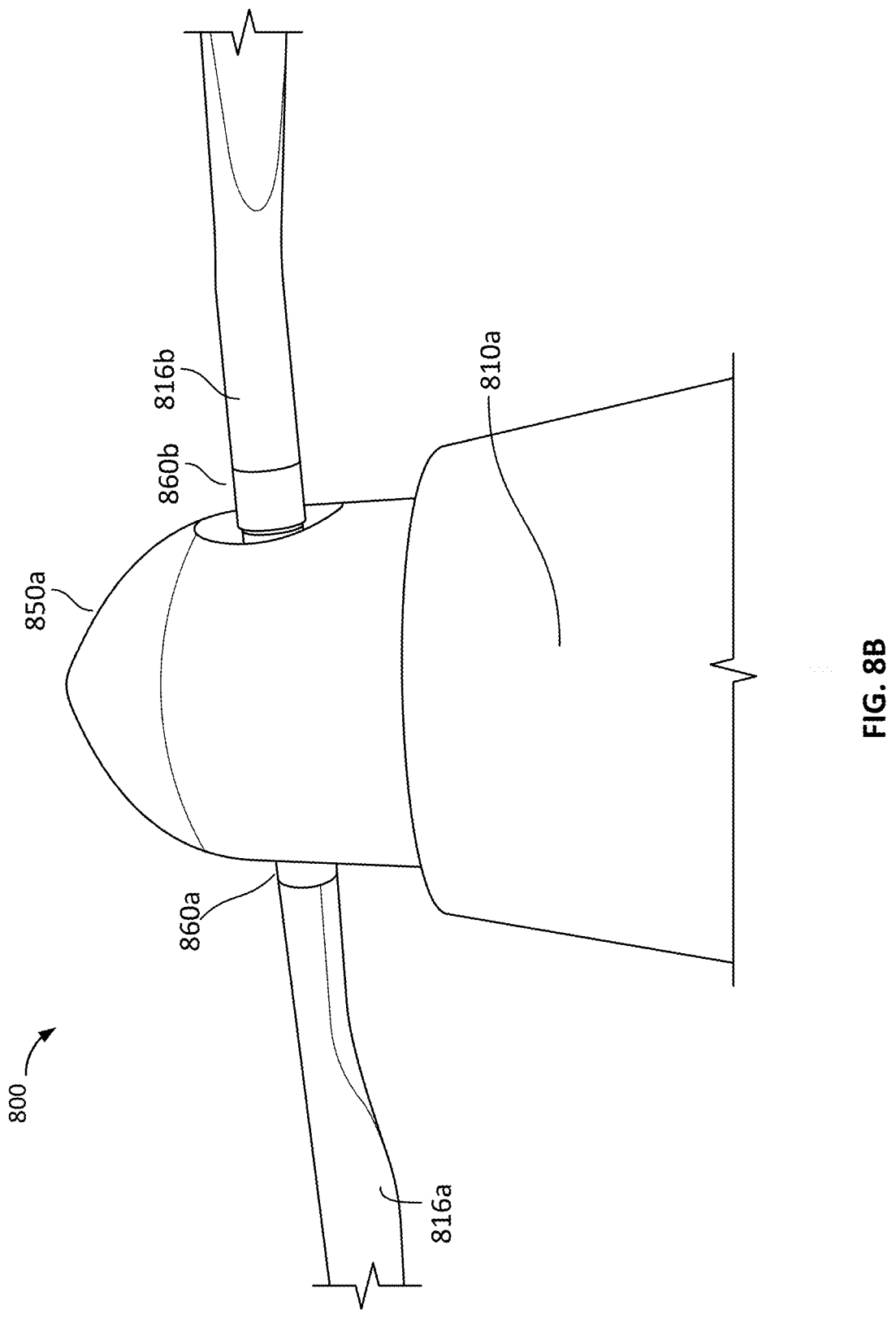

FIGS. 8A and 8B is a diagram of a step in a sequence for assembling an aircraft to include rotor blades according to various embodiments. In the example shown at 890 and at 892, the proprotor blades (e.g., the rotor blade assemblies respectively comprising a blade cuff and a rotor blade) are installed. In some embodiments, installing the proprotor blades is a process that does not require any additional tools. For example, a human operator may install the proprotor blades by hand. In some embodiments, the proprotor blades are installed according to the installation process illustrated at FIG. 7B. For example, proprotor blade 816a and/or proprotor blade 816b is/are moved in an installation direction towards proprotor hub 850a comprised in first nacelle 810a of aircraft 800. Proprotor blade 816a and/or proprotor blade 816b is/are pushed towards proprotor hub 850a until the notches on the internal circumferences of the cavity defined by blade cuff 860a and/or blade cuff 860b of proprotor blade 816a and/or proprotor blade 816b, respectively, have been pushed past a set of gaps in ridges on the external circumference of a spindle (e.g., spindle 840b) on proprotor hub 850a. After proprotor blade 816a and/or proprotor blade 816b has/have been sufficiently pushed in the installation direction, proprotor blade 816a and/or proprotor blade 816b is/are rotated such as in a clockwise direction. Proprotor blade 816a and/or proprotor blade 816b is/are twisted sufficiently for the notches on the internal circumferences of the cavity defined by proprotor blade 816a and/or proprotor blade 816b to become mis-aligned with the set of gaps in ridges on the external circumference of a spindle (e.g., spindle 840b) of proprotor hub 850a. The human operator can then release proprotor blade 816a and/or proprotor blade 816b and a biasing force by a biasing member of a spindle (e.g., spindle 840b) of proprotor hub 850a pushes proprotor blade 816a and/or proprotor blade 816b in a direction opposite the installation direction.

Figure 9:
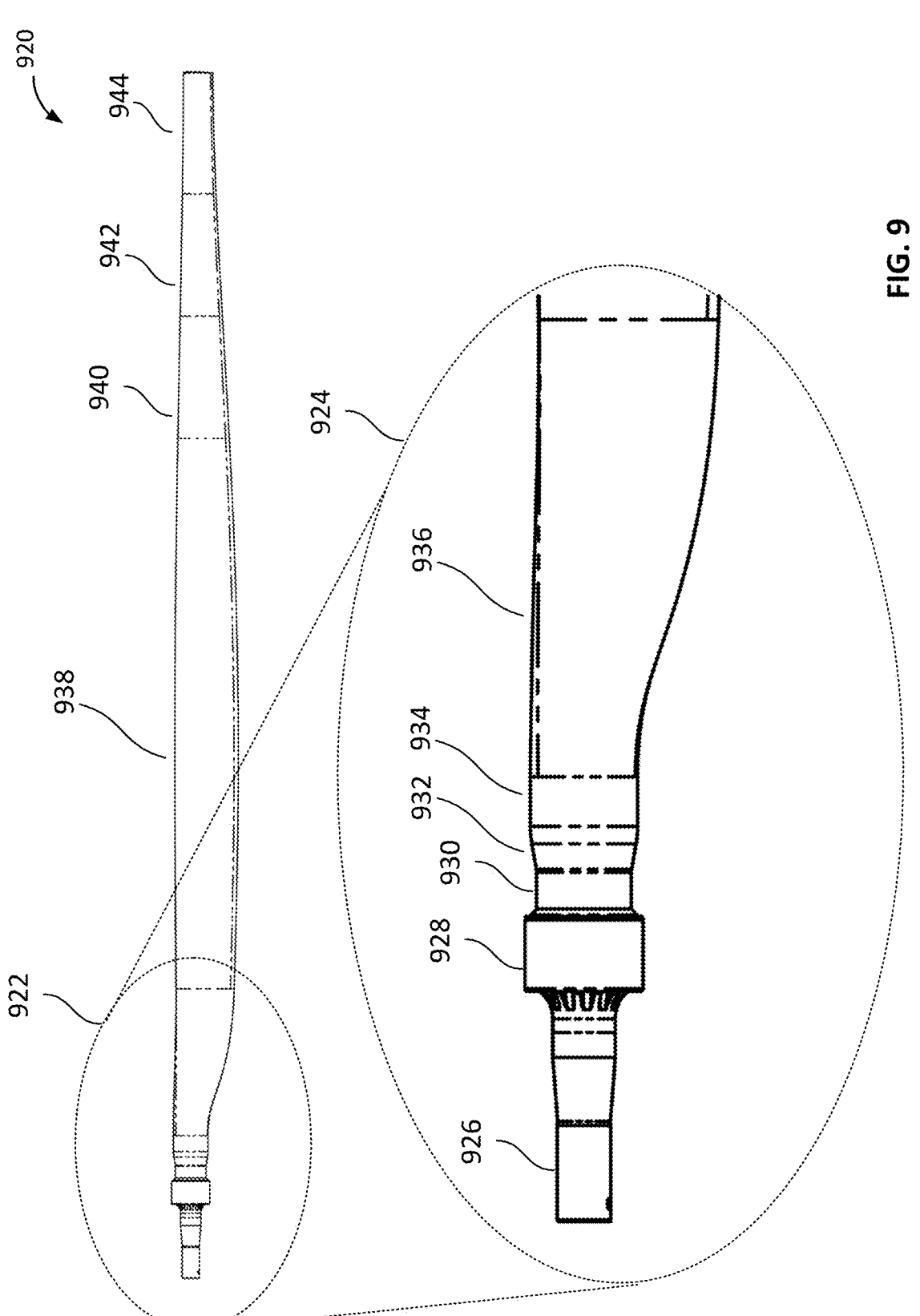
FIG. 9 is a block diagram illustrating an embodiment of a rotor blade.

FIG. 9 is a block diagram illustrating an embodiment of a rotor blade. In some embodiments, the rotor blade 920 of FIG. 9 comprises a rotor blade of FIGS. 1, 2, 4A, and/or 4C. In the example shown, rotor blade 920 includes proximal end to the attachment end shown in close up area 922 as shown in zoom 924. In zoom 924, proximal end to the attachment point is shown with spindle 926, which connects to rotating portion of rotor hub bearings to constrain the blade and which also contains features to mate with the blade cuff 928 for tool-less assembly/disassembly. Blade cuff 928 includes neck 930, shoulder 932, and distal end of blade cuff 934. Some fibers of rotor blade 920 extend from neck 930 to segment A 936, segment B 938, segment C 940, segment D 942, and segment E 944.

Figure 10:
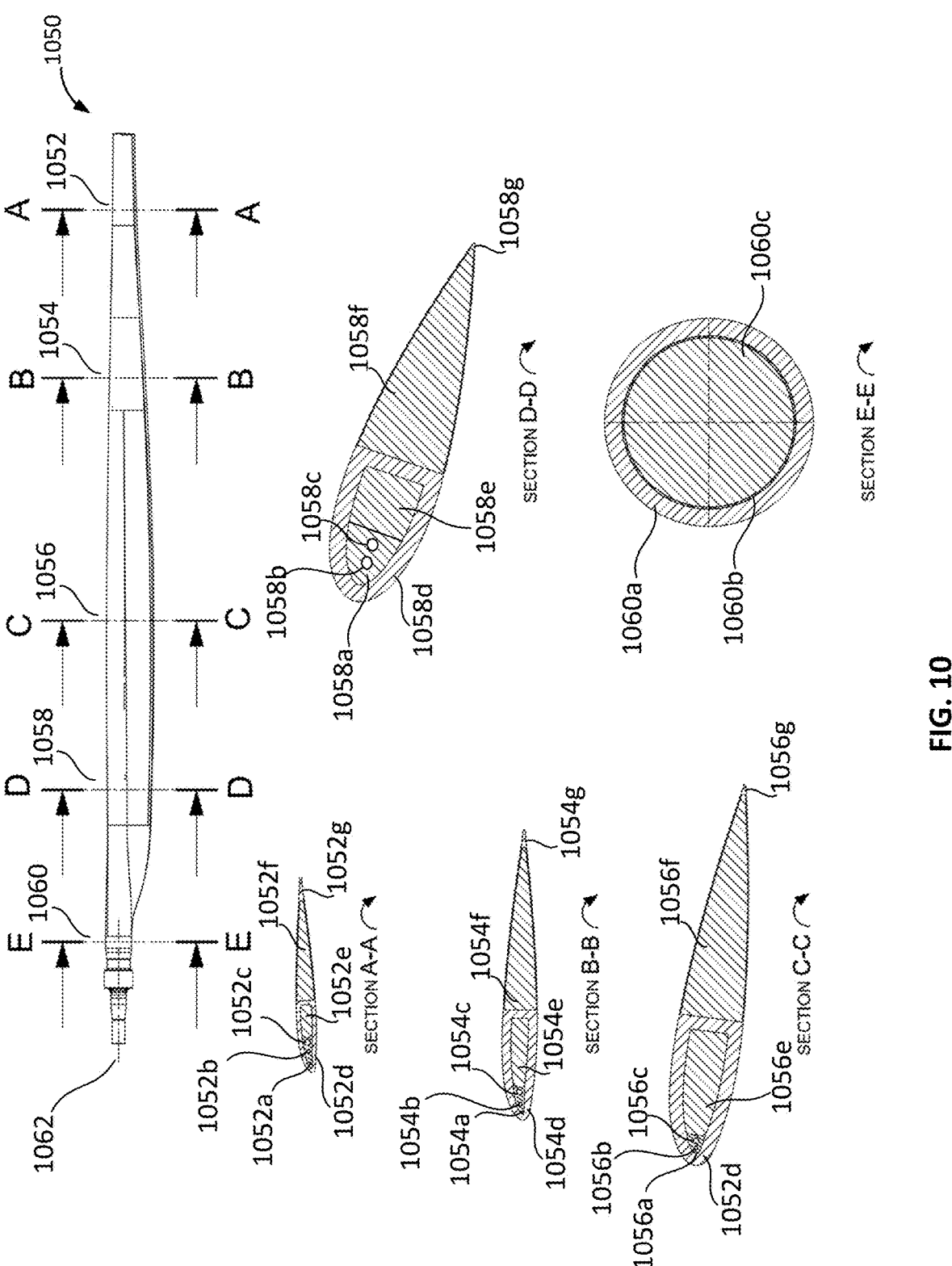
FIG. 10 are block diagrams showing cross sections of a rotor blade.

FIG. 10 are block diagrams showing cross sections of a rotor blade. In some embodiments, rotor blade 1050 of FIG. 10 comprises a rotor blade of FIGS. 1, 2, 4A, 4C, and/or 9. In the example shown, rotor blade 1050 is shown with indications of cross sections at 1052, 1054, 1056, 10510, and 1060. Rotor blade 1050 has different profiles or cross sections different positions along its length. As illustrated, the front sections have a steeper profile slope than the back sections, which have a more gradual or elongated slope. Cross section at 1052 includes front edge section 1052a, front edge balancing weight 1052b, second balancing weight 1052c, front fiber-resin wrapping 1052d, front core section 1052e, back core section 1052f, and back fiber-resin wrapping 1052g. Cross section at 1054 includes front edge section 1054a, front edge balancing weight 1054b, second balancing weight 1054c, front fiber-resin wrapping 1054d, front core section 1054e, back core section 1054f, and back fiber-resin wrapping 1054g. Cross section at 1056 includes front edge section 1056a, front edge balancing weight 1056b, second balancing weight 1056c, front fiber-resin wrapping 1056d, front core section 1056e, back core section 1056f, and back fiber-resin wrapping 1056g. Cross section at 1058 includes front edge section 1058a, front edge balancing weight 1058b, second balancing weight 1058c, front fiber-resin wrapping 1058d, front core section 1058e, back core section 1058f, and back fiber-resin wrapping 1058g. Cross section at 1060 includes fiber-resin wrap 1060a, blade cuff 1060b, and center fiber-resin core 1060c. Rotor blade 1050 is designed to balance along mounting center line 1062 so that mass is balanced around mounting center line 1062 (e.g., that forward side mass is balanced with back side mass using the balancing weights that are added to the front edge sections).

Figure 11:
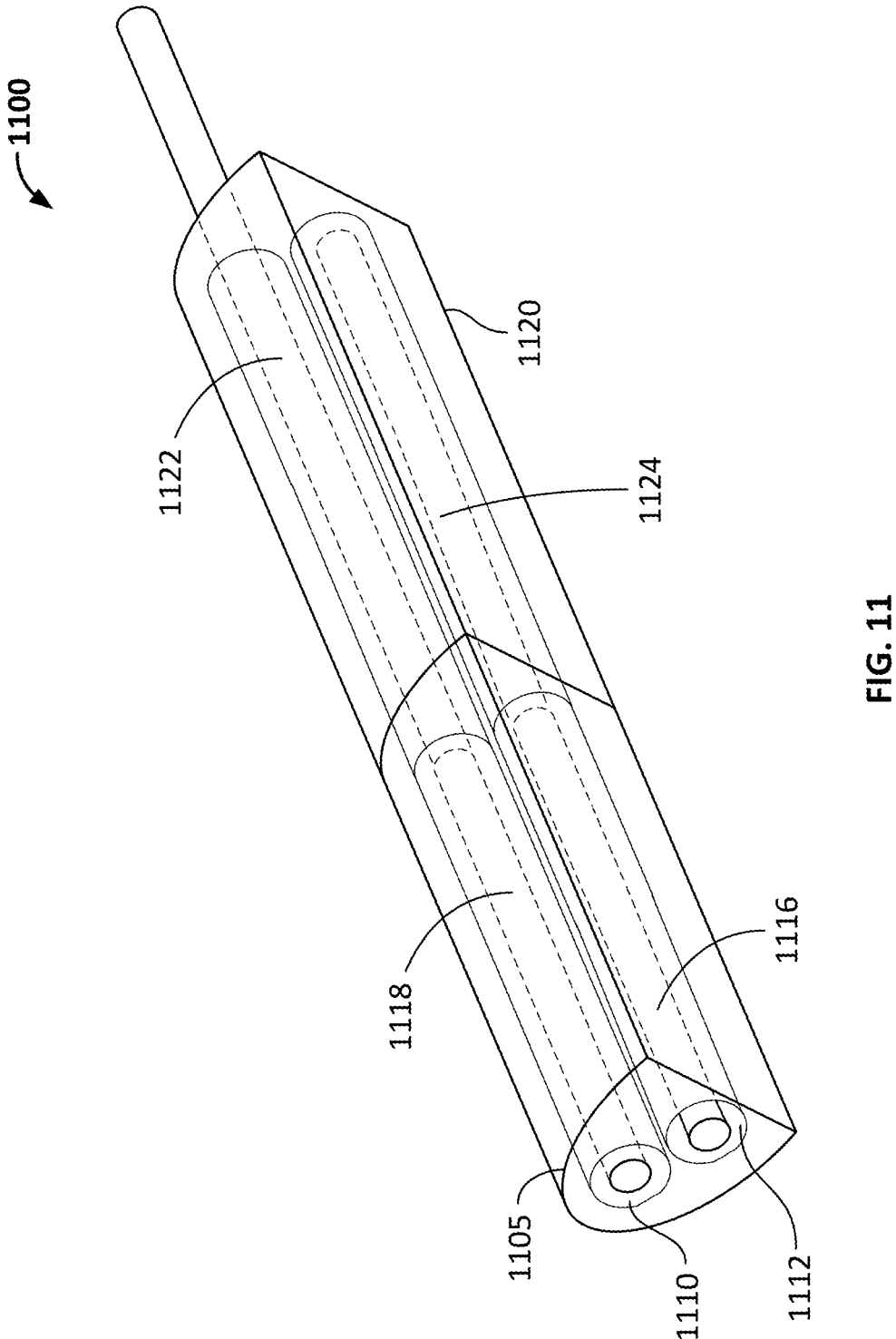
FIG. 11 is a diagram of a portion of a front edge of a rotor blade according to various embodiments.

FIG. 11 is a diagram of a portion of a front edge of a rotor blade according to various embodiments. In some embodiments, front edge section 1100 of FIG. 11 comprises a portion of a front edge of a rotor blade of FIGS. 1, 2, 4A, 4C, 9 and/or 10. In the example shown, a portion of front edge section 1100 (e.g., the front edge assembly) comprises a plurality of blocks or cores, such as proximal block 1105 and distal block 1120 that can be bonded together to substantially extend (e.g., to form) the length of the rotor blade. Front edge section 1100 is bonded to a front core (not shown) and then later a back core (not shown), which collectively hold the geometry of the rotor blade support before being wrapped with fibers that are fused with a cured resin. Proximal block 1105 and/or distal block 1120 may comprise (e.g., is/are composed of) foam. As an example, proximal block 1105 and/or distal block 1120 is/are comprised of a foam core material (e.g., Rohacell®).

In the example shown, front edge section 1100 comprises a plurality of tubes (e.g., tube 1110 and tube 1112), which provide space in proximal block 1105 and also in distal block 1120 in which a plurality of balancing weights is/are disposed (e.g., inserted weight 1116, inserted weight 1118, inserted weight 1122, and inserted weight 1124). For example, a plurality of weights may be stainless steel rods, tungsten rods, steel and tungsten rods, or any other appropriate rod. In some embodiments, an inserted weight length is matched to a block length (e.g., inserted weight 1116 and inserted weight 1118 are matched to length of proximal block 1105 and inserted weight 1124 is matched to length of distal block 1120). In some embodiments, an inserted weight length is not matched to a block length (e.g., is shorter or longer—for example, inserted weight 1122 is longer than distal block 1120). In various embodiments, one, two, three, or any other number of tubes are created in a block to allow a weight (e.g., a rod of stainless steel, tungsten, tungsten and stainless steel, or any other appropriate material) to be inserted into the tube of the block for balancing the weight of a rotor blade. In some embodiments, the tube(s) have openings that are just large enough to accommodate the weights and are used to accurately dispose the weights within the blade structure to balance the center of gravity of the blade. For example, the front half of the rotor blade (e.g., the part of the rotor blade more forward than a center axis) weighs the same as the back half of the rotor blade (e.g., the part of the rotor blade more backward than the center axis). The balancing weights are configured and/or positioned to collectively cause the rotor blade assembly to be balanced (e.g., the rotor blade assembly can stand erect when placed on a proximal end of the blade cuff). In some embodiments, the rotor blade is configured to have a center axis positioned such that one quarter of the width of the rotor blade is on the front half/part, and three quarters of the width of the rotor blade is on the back half/part. In some embodiments, the balancing weights are manufactured to comprise a set of tungsten rods that are bonded together. The balancing weights can be used for alignment and counter balancing. Various numbers and sizes of balancing weights can be used. In some embodiments, the rotor blade comprises ten balancing weights.

Figure 12:
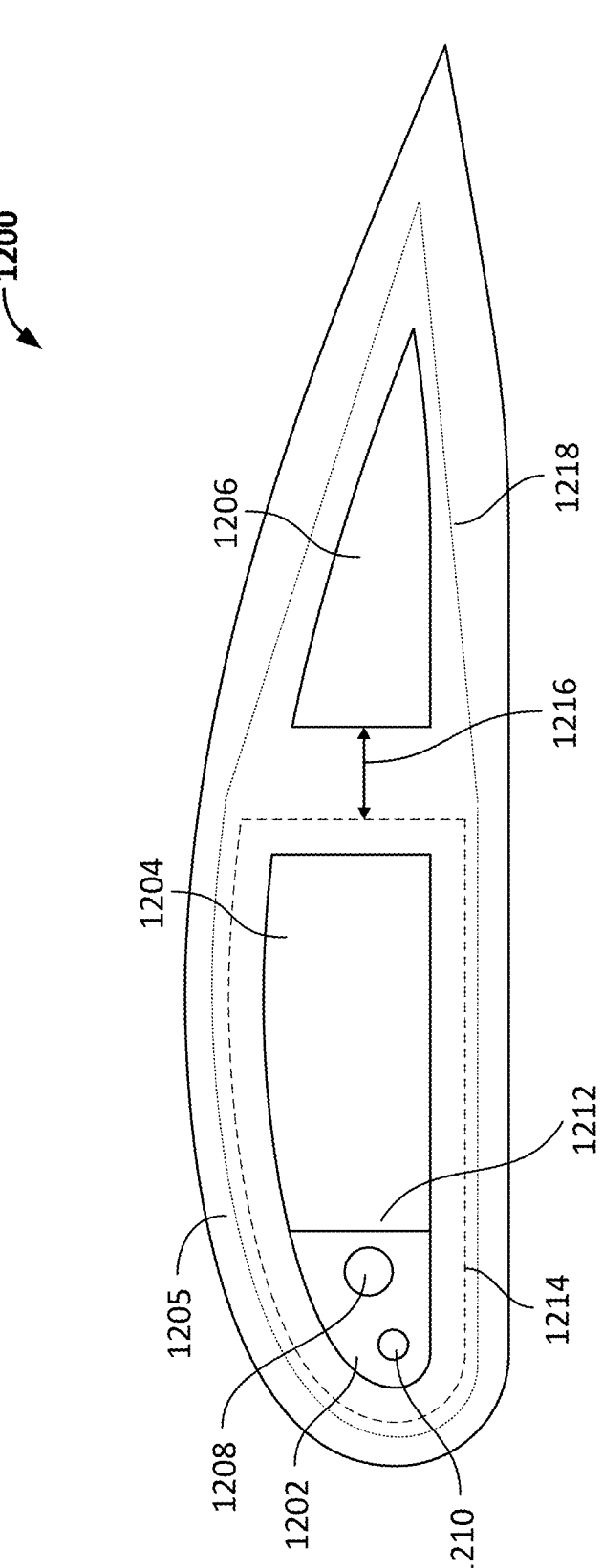
FIG. 12 is a diagram illustrating an embodiment of a cut away view of a rotor blade.

FIG. 12 is a diagram illustrating an embodiment of a cut away view of a rotor blade. In some embodiments, the cut away view of rotor blade of FIG. 12 comprises a cut away of rotor blade shown in FIGS. 1, 2, 4A, 4C, 9 and/or 10. In the example shown, rotor blade 1200 comprises front edge section 1202, front core section 1204, and back core section 1206. Front edge section 1202, front core section 1204, and back core section 1206 provide the scaffolding for the formation of the rotor blade.

In some embodiments, rotor blade 1200 is fabricated by 1) inserting weights into tube 1208 and tube 1210 of front edge section 1202; 2) bonding front edge section 1202 to front core section 1204 along interface 1212 using an adhesive (e.g., an epoxy, a glue, etc.); 3) wrapping front edge section 1202 and front core section 1204 using a plurality of fibers in front fiber layer(s) 1214 (e.g., fibers in one direction in a single layer, fibers in two directions in two layers, fibers in three directions in three layers, etc.); 4) bonding wrapped front edge section 1202/front core section 1204 to back core section 1206 using an adhesive (e.g., an epoxy, a glue, etc.) at interface 1216; 5) wrapping wrapped front edge section 1202/front core section 1204 and back core section 1206 using a plurality of fibers in all-blade fiber layer(s) 1218; 6) placing the wrapped front edge section 1202/front core section 1204/back core section 1206 in a mold; 7) injecting resin into the mold; 8) bake in mold; 9) remove from mold; 10) finish outer surface 1205; and 11) test and inspect rotor.

Although the illustrated example provides a front section bonded to a front core, in some embodiments a single front core is used to form the geometry of the front edge of the rotor blade and is configured to hold the balancing weights.

In some embodiments, front section (e.g., front edge section 1202 and front core section 1204) is not wrapped in fibers before being bonded to back core 1206.

In various embodiments, planes of fibers (e.g., for the plurality of fibers in front fiber layer(s) and for the plurality of fibers in all-blade fiber layer(s)) can be oriented in various directions (e.g., a first set of planes extend the length of the rotor blade, a second set of planes extend the width of the rotor blade such as orthogonal to the planes extending the length of the rotor blade, and, optionally, a third set of planes may be oriented at various other angles relative to the first set of planes).

Figure 13:
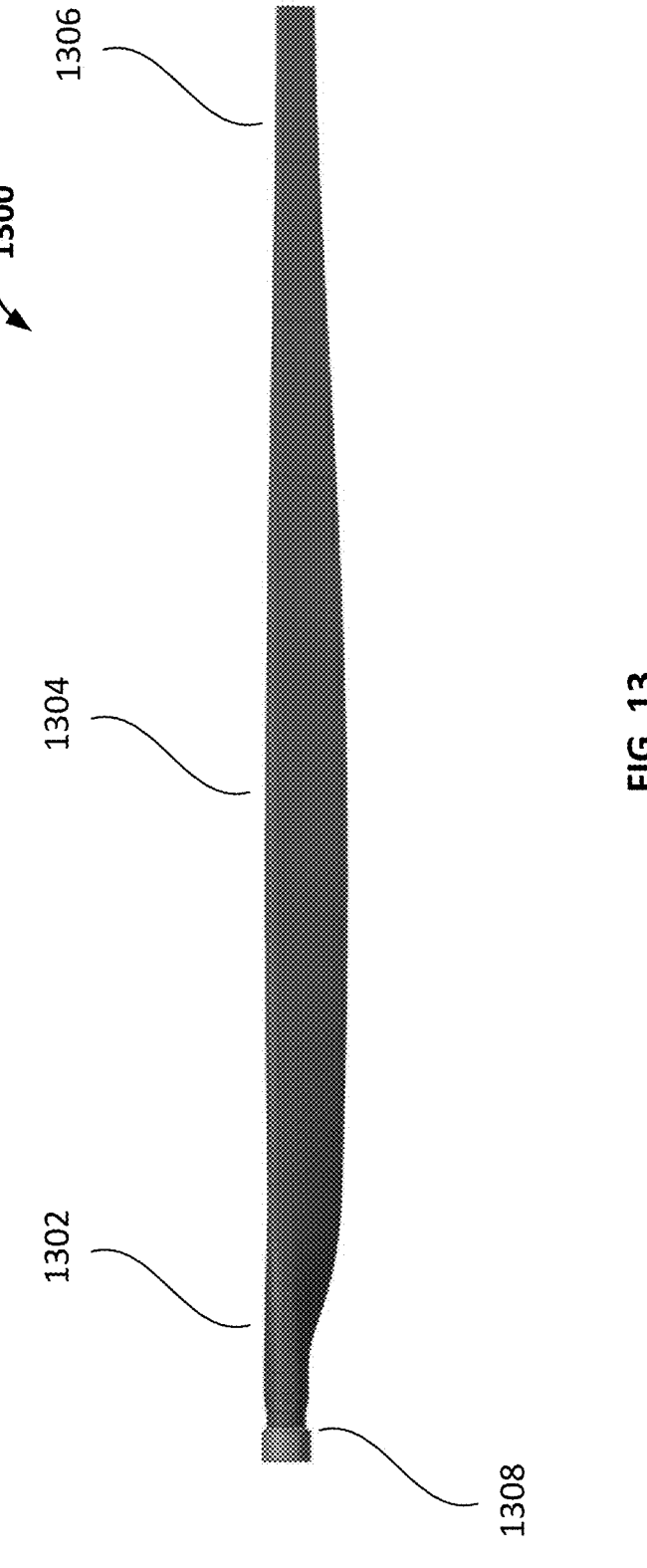
FIG. 13 is a top view of a rotor blade according to various embodiments.

FIG. 13 is a top view of a rotor blade according to various embodiments. In some embodiments, the top view of rotor blade of FIG. 13 comprises a top of rotor blade shown in FIGS. 1, 2, 4A, 4C, 9, and/or 10. In the example shown, rotor blade 1300 comprises blade cuff 1308, proximal section 1302, middle section 1304, and distal section 1306.

In some embodiments, the laying up of fibers on the rotor blade 1300 comprises laying up different numbers of fibers (or planes of fiberglass or carbon fibers) across proximal section 1302, middle section 1304, and distal section 1306. For example, the number of planes of fibers are laid up in the proximal section 1302 is greater than the planes of fibers are laid up in the distal section 1306. As example, the number of planes of fibers are laid up in the proximal section 1302 is greater than the planes of fibers are laid up in the middle section 1304. As an example, the number of planes of fibers are laid up in the middle section 1304 is greater than the planes of fibers are laid up in the distal section 1306.

In some embodiments, the number of fibers laid up on rotor blade 1300 gradually decreases when moving from blade cuff 1308 to proximal section 1302 to distal section 1306. For example, those parts of rotor blade 1300 expected to experience greater stress during operation are reinforced with a greater number of fibers.

In some embodiments, the number of fibers (e.g., the number of planes of fiberglass or carbon fibers) disposed at proximal section 1302 of rotor blade 1300 is different from the number of fiber glass fibers disposed at distal section 1306 of the rotor blade 1300. For example, at proximal section 1302 of rotor blade 1300 (e.g., towards blade cuffn 1308), 26-ply layers may be laid up on rotor blade 1300. In contrast, at distal section 1306 of rotor blade 1300 6-ply layers may be laid up on rotor blade 1300. Various other numbers of planes or fibers can be implemented. For example, proximal section 1302 of rotor blade 1300 has N-ply fibers, where N is a positive integer; and distal section of rotor blade 1300 has M-ply fibers, where M is a positive integer. Additionally, N may be greater than M. A greater number of fibers (or planes of fiberglass or carbon fibers) is used in areas of rotor blade 1300 that are expected to receive more stress/force. In some embodiments, a first subset of the fibers can be laid up longitudinally along the length of the forward section (e.g., length of the rotor blade), and a second subset of fibers can be laid up orthogonally to the first subset of fibers so that the second subset of fibers are oriented along the width of the forward section (e.g., along the width of the rotor blade). In some implementations, at least part of the second subset of fibers are wrapped around the forward section widthwise. In some embodiments, the wrapping of the forward edge section and front core comprises laying up a third subset of fibers at diagonal directions relative to the first subset of fibers or second subset of fibers. For example, at least part of the third subset of fibers is oriented at 45 degrees relative to the first subset of fibers.

In some embodiments, the orientation of the fibers laid up on the forward section is configured so that the fibers are directed in a manner that the rotor blade is expected to receive stress during flight. In some embodiments, the plurality of fibers comprises a plurality of different planes of fibers (e.g., wrappings of the fiberglass or carbon fibers). As an example, the forward section (or the rotor blade) may comprise between 20 and 30 different planes of fiber wrappings, and at least a first subset of the planes and a second subset of planes are oriented in different angles (e.g., relative to the length of the rotor blade).

According to various embodiments, different sections of the rotor blade are used for different functions (e.g., vertical flight versus horizontal flight). When the aircraft is travelling in vertical flight the aircraft travels at a relatively lower velocity as compared to when the aircraft is travelling in horizontal flight. The rotor blade edge(s) (e.g., the distal section of the blade) may be used for vertical flight and the closer section (e.g., the proximal section of the blade) may be used for horizontal flight.

Figure 14:
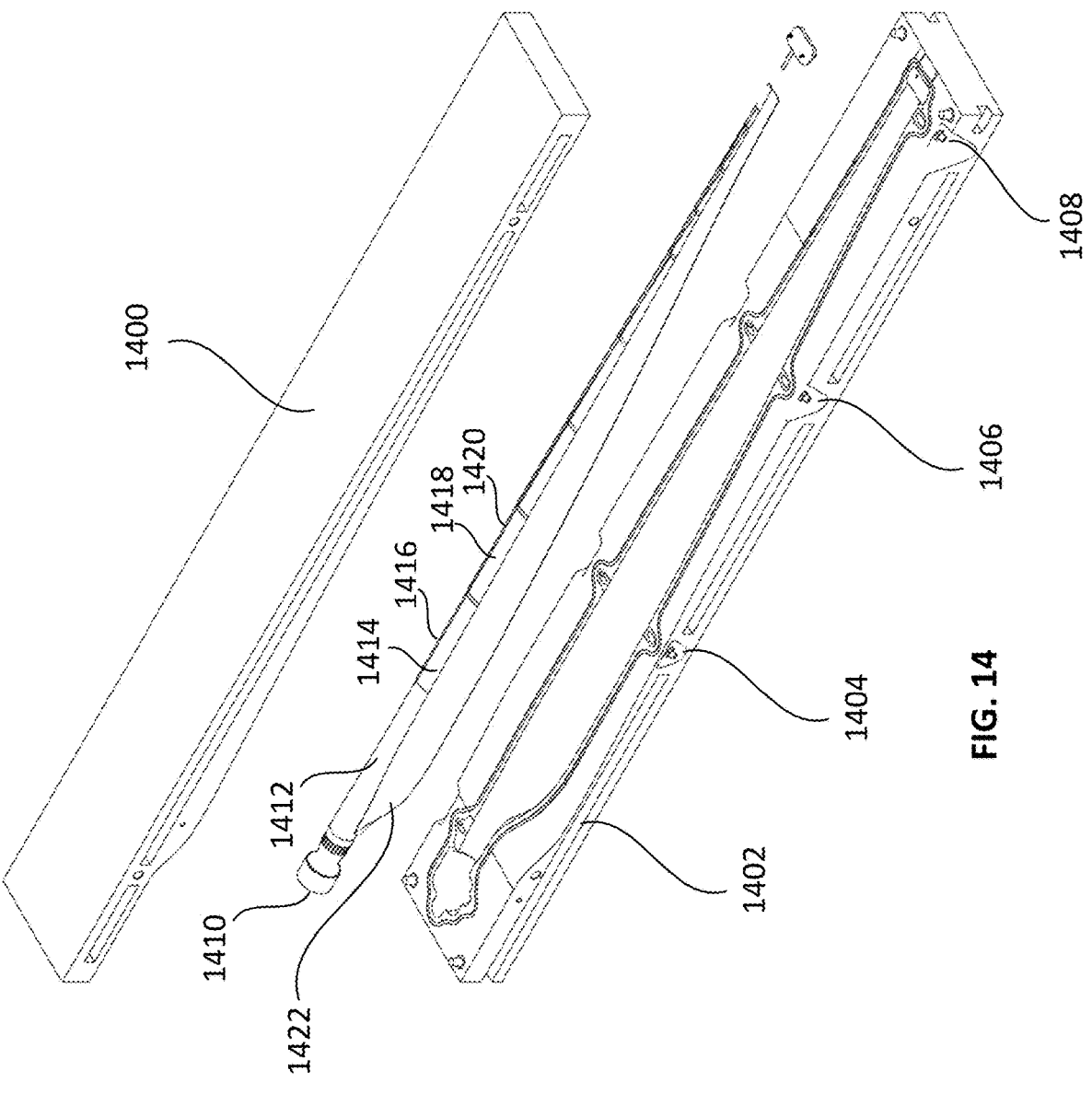
FIG. 14 is a diagram illustrating an embodiment of a fabrication step for a rotor blade.
Figures 15A, 15B, 15C, 15D:
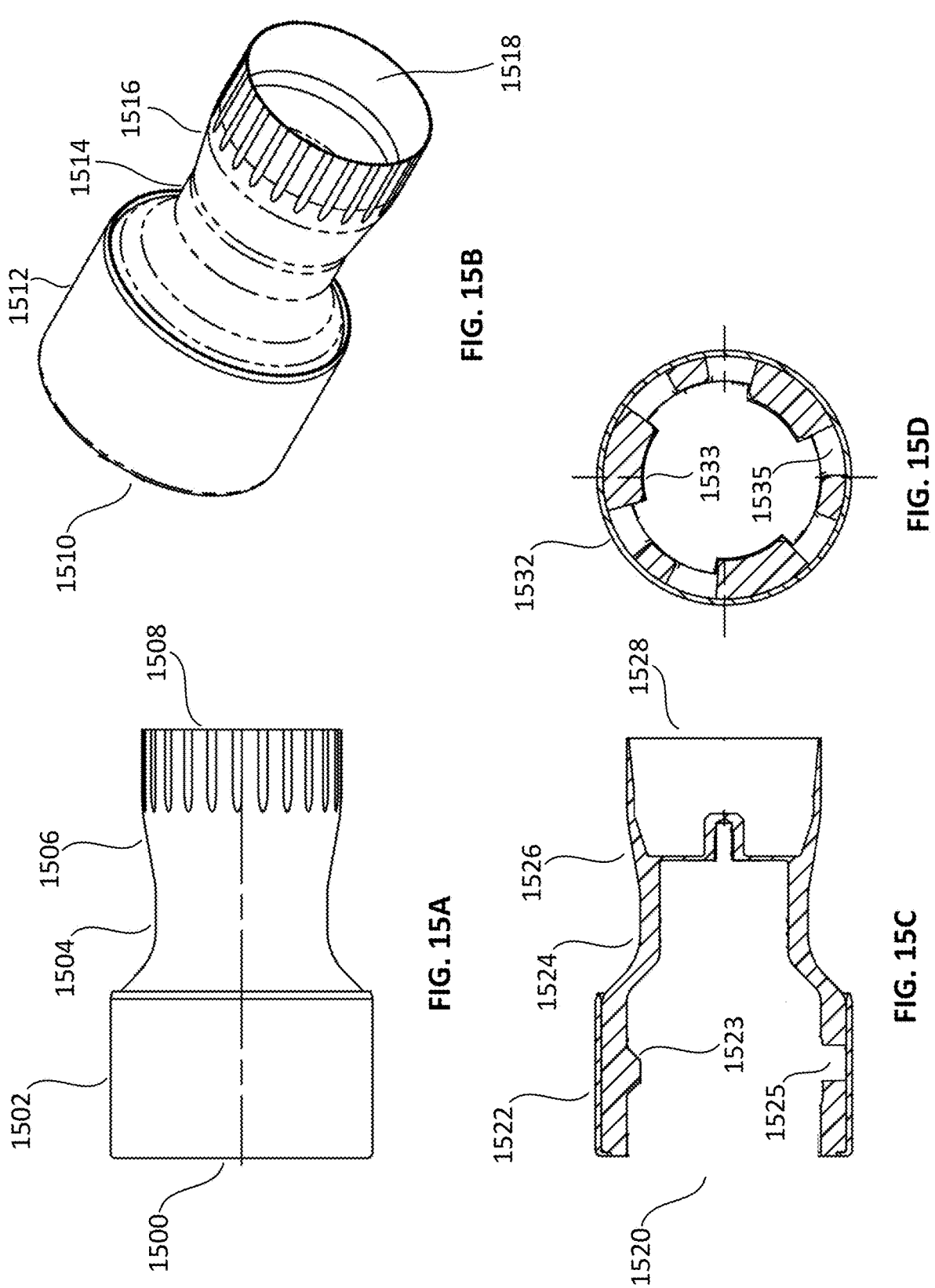
FIGS. 15A, 15B, 15C, and 15D are diagrams illustrating an embodiment of a blade cuff.

FIG. 14 is a diagram illustrating an embodiment of a fabrication step for a rotor blade. In some embodiments, rotor blade being fabricated in FIG. 14 comprises a rotor blade shown in FIGS. 1, 2, 4A, 4C, 9 and/or 10. In the example shown, top mold 1400 mates with bottom mold 1402 to surround blade cuff 1410, front core section 1412, back core section 1422, front edge section 1416 including weights, front core section 1414, front edge section 1420 including weights, and front core section 1418. Top mold 1400 and bottom model 1402 are sealed and resin in injected into mold and the resin is heated for curing. In some embodiments, the resin is pulled into chamber using a vacuum. In some embodiments, access opening 1404, access opening 1406, and access opening 1408 are used for injection of resin or vacuum application to draw resin into the mold opening. The vacuum also ensures that air is removed so that the resin completely fills the mold chamber. In some embodiments, the front core sections are segmented at different lengths along the rotor blade as compared to the front edge sections (e.g., there might be two or more front edge sections for each length of front core section). In some embodiments, there are multiple front core sections for back core section lengths (e.g., in the example shown, there is one back core section 1422 for the multiple front core sections).

After the injection mold has been sufficiently impregnated with resin, the rotor blade is baked. For example, the resin is cured to harden and maintain the shape of the rotor blade. In some embodiments, the rotor blade is cured in a single curing step.

In some embodiments, the rotor blade is removed from the injection mold. The rotor blade may be optionally post-processed to further refine the finish of the rotor blade surface.

After manufacture of the rotor blade, the rotor blade may be tested to ensure that it conforms with the predefined specifications. For example, the rotor blade is tested to ensure that it can withstand the forces expected during operation. The rotor blade may be connected to a rotor that is driven at higher speeds than is expected in operation. For example, the rotor blade is tested at 110% of the design speed to ensure that the blade does not break under the stress or otherwise fall apart. Additional testing may be performed, such as a balancing test, a stiffness test (e.g., hanging weights off the rotor blade and measuring displacement), etc. The testing process may be less burdensome than testing required for passenger-carrying aircraft. Further, the expected lifetime of the rotor blade is less than the expected lifetime of passenger-carrying aircraft and thus the testing may only be sufficient to confirm that the rotor blade will generally comply with its expected lifetime.

FIGS. 15A, 15B, 15C, and 15D are diagrams illustrating an embodiment of a blade cuff. In the example shown in FIG. 15A, a side view is displayed with blade cuff proximal end 1500, blade cuff sleeve 1502, blade cuff neck 1504, blade cuff shoulder 1506, and blade cuff distal end 1508. In the example shown in FIG. 15B, a perspective view is displayed with blade cuff proximal end 1510, blade cuff sleeve 1512, blade cuff neck 1514, blade cuff shoulder 1516, and blade cuff distal end 1518. In the example shown in FIG. 15C, a lengthwise cut view is displayed with blade cuff proximal end 1520, blade cuff sleeve 1522, blade cuff neck 1524, blade cuff shoulder 1526, and blade cuff distal end 1528. Ridge 1523 and notch 1525 are used for being able to bayonet mount and lock the blade cuff to a spindle attached to a rotor hub. In the example shown in FIG. 15D, a crosswise cut view is displayed with blade cuff blade cuff sleeve 1532, ridge 1533, and notch 1535. Ridge 1533 and notch 1535 are used for being able to bayonet mount and lock the blade cuff to a spindle attached to a rotor hub.

Blade cuff proximal end 1500, blade cuff proximal end 1510, and blade cuff proximal end 1520 comprise a proximal face defining an opening for inserting a spindle from a rotor hub. Blade cuff proximal end 1500, blade cuff proximal end 1510, and blade cuff proximal end 1520 are configured to mate with the spindle to form a secure and detachable connection.

Blade cuff neck 1504, blade cuff neck 1514, and blade cuff neck 1524 have a smaller cross section than blade cuff distal end 1508, blade cuff distal end 1518, and blade cuff distal end 1528, respectively. Fibers are disposed extending from blade cuff neck 1504, blade cuff neck 1514, and blade cuff neck 1524, respectively, to extend past blade cuff distal end 1508, blade cuff distal end 1518, and blade cuff distal end 1528, respectively, along a blade. Blade cuff shoulder 1506, blade cuff shoulder 1516, and/or blade cuff shoulder 1526 is/are surfaces that support the centrifugal force from the blade back to a rotor spindle.

Blade cuff distal end 1508, blade cuff distal end 1518, and/or blade cuff distal end 1528 couple to the blade (e.g., the center opening of the blade cuff distal end mounts a cylindrical mounting volume of the blade).

In some embodiments, the blade cuff comprises (e.g., is machine out of) titanium. Various other types of rigid materials may be used, such as stainless steel, steel, or other metals, etc.

Figure 16:
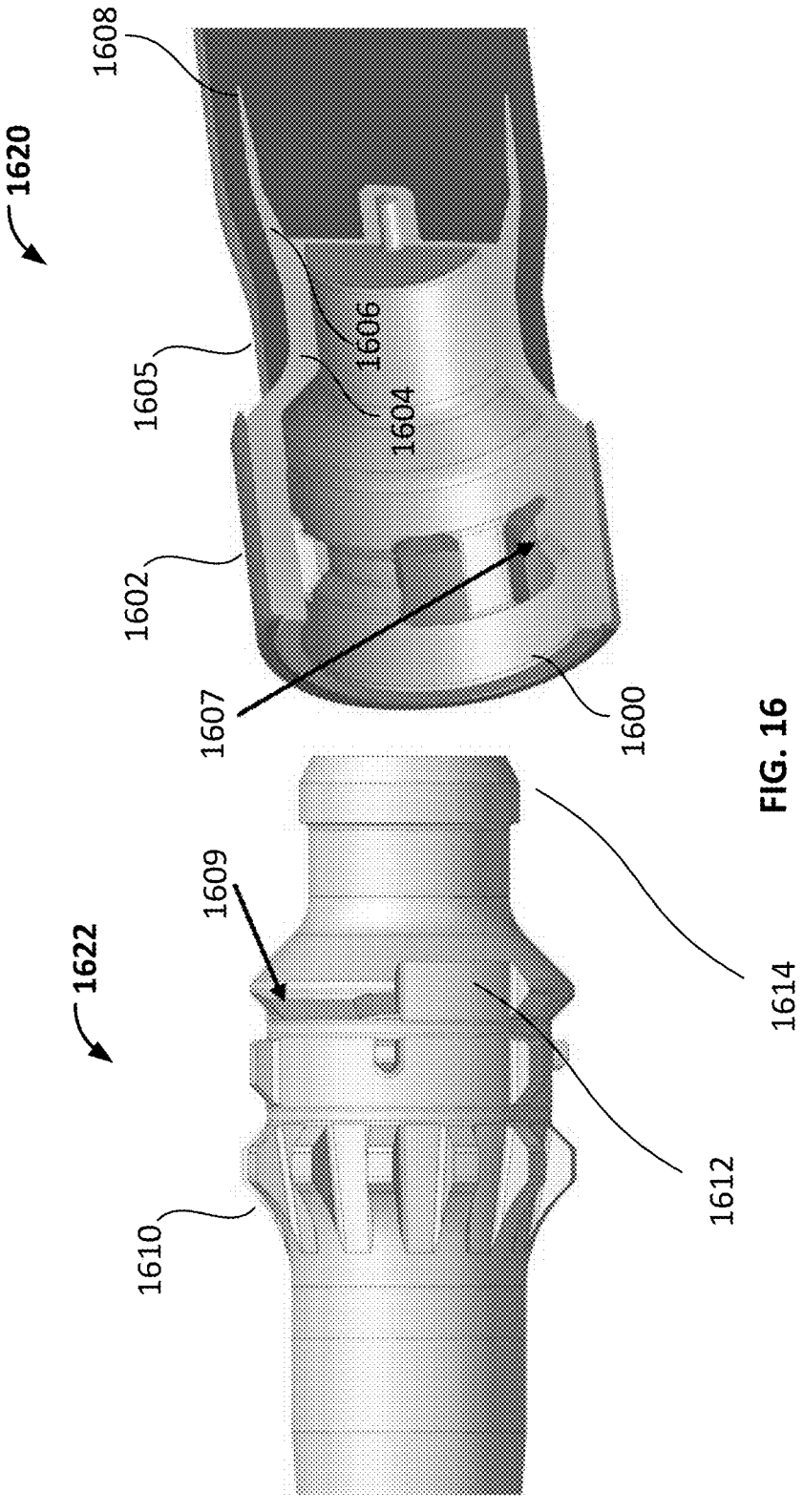
FIG. 16 is a diagram illustrating an embodiment of a blade cuff and spindle.

FIG. 16 is a diagram illustrating an embodiment of a blade cuff and spindle. In some embodiments, blade cuff 1620 of a rotor blade and spindle 1622 comprise blade cuff 860a or blade cuff 860b of proprotor blade 816a or proprotor blade 816b of FIG. 8A and FIG. 8B. In the example shown, spindle 1622 is coupled to a rotor hub (not shown) and includes a number of ridges (e.g., ridge 1610 and ridge 1609) and gaps (e.g., gap 1612) that enable corresponding ridges (e.g., ridge 1607) and gaps on blade cuff 1620 to be able to be manually attached and detached by sliding together and twisting (e.g., a bayonet style mounting and unmounting). Proximal end opening 1600 of blade cuff 1620 is maneuvered to surround distal end of spindle 1614. The ridges and gaps of blade cuff 1620 mate with the ridges and gaps of spindle 1622 to allow the rotor blade attached to blade cuff 1620 to be firmly coupled to spindle 1622 in a locked position.

Blade cuff 1620 comprises blade cuff sleeve 1602, aperture 1600 on the proximal end of blade cuff 1620, blade cuff neck 1604, blade cuff shoulder 1606, and distal end 1608 of blade cuff 1620. Rotor blade comprises fiber and resin 1605 that surrounds blade cuff 1620 including blade cuff neck 1604 and blade cuff shoulder 1606 so that the shoulder of blade cuff 1620 can support the centrifugal force of the rotor blade. In some embodiments, fibers run from blade cuff neck 1604 over blade cuff shoulder 1606 and extend down the length of the rotor blade.

Figure 17:
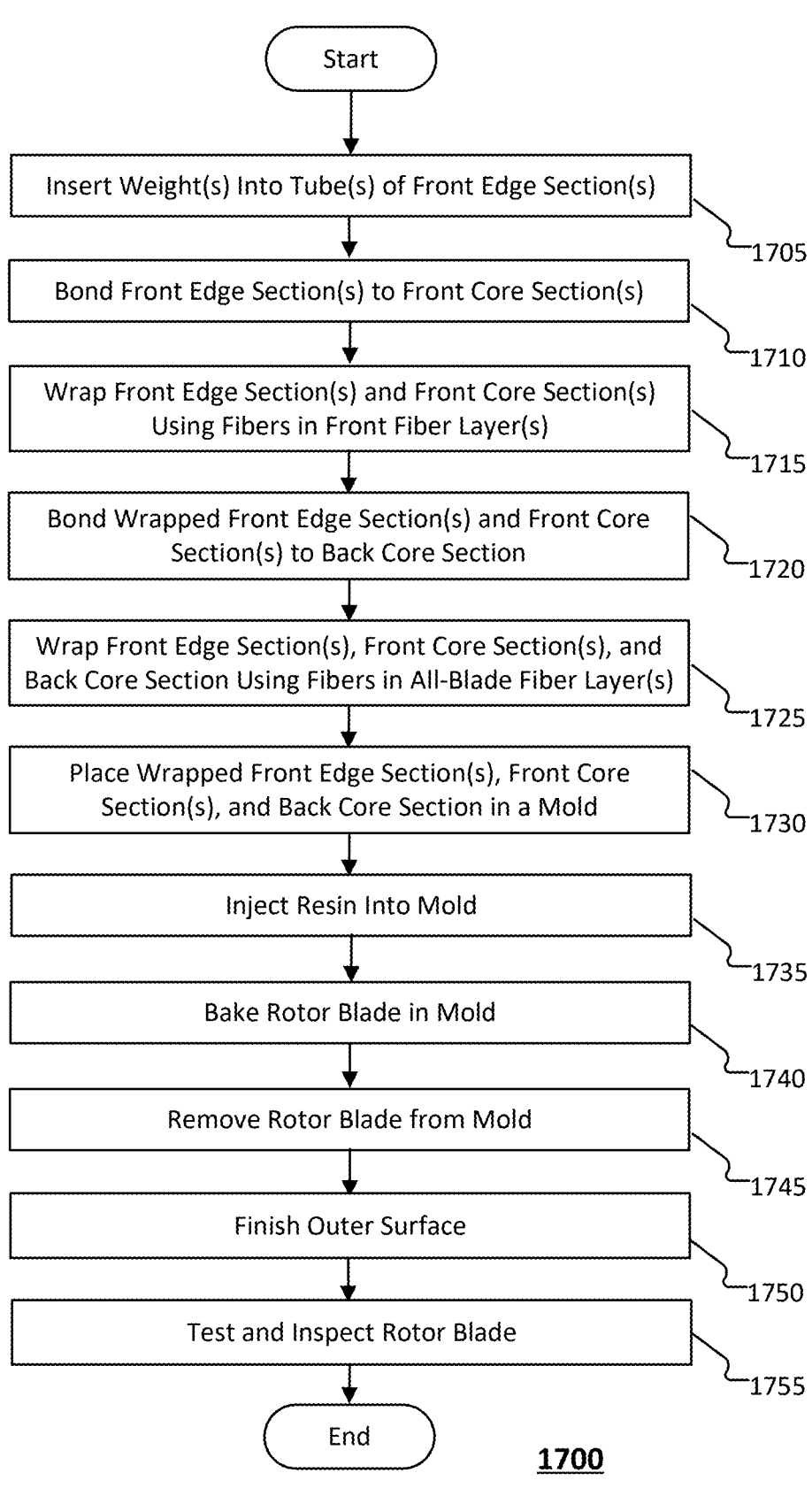
FIG. 17 is a flow diagram illustrating an embodiment of a process for fabrication of a rotor blade.

FIG. 17 is a flow diagram illustrating an embodiment of a process for fabrication of a rotor blade. In some embodiments, the steps of FIG. 17 are used to manufacture a rotor blade shown in FIGS. 1, 2, 4A, 4C, 9, 10, and/or 13. In the example shown, in 1705, weight(s) are inserted into tube(s) of front edge section(s). For example, for a given front edge section a weight is inserted into each tube of the front edge section. Front edge sections are bonded together. In 1710, front edge section(s) are bonded to front core section(s). For example, each of the front edge sections are bonded to a front core section. In some embodiments, a plurality of front edge sections are bonded to a front core section. In some embodiments, a plurality of front core sections are bonded to a front edge section. In some embodiments, a single front edge section is bonded to a single front core section. In some embodiments, a front edge section is bonded to a front core section using an adhesive (e.g., an epoxy, a glue, etc.). In 1715, bonded front edge section(s) and front core section(s) are wrapped using a plurality of fibers in one or more fiber layers. For example, fibers are wrapped around the front section(s) of the rotor blade (e.g., the front edge section(s) with weights and the front core section(s) bonded together) in one or more layers, where each layer may be aligned in a different direction to handle the stress forces that the rotor blade experiences. In 1720, the wrapped front edge section(s) and front core section(s) is bonded to a back core section. For example, one or more back core sections are bonded or adhered to the fiber wrapped front edge section(s) and front core section(s). In some embodiments, the back core section is a single section that is bonded to a plurality of front edge sections and a plurality of front core sections. In 1725, front edge section(s), front core section(s), and back core section(s) are wrapped using a plurality of fibers in one or more fiber layers. For example, fibers are wrapped over the sections in one or more layers, where each layer may be aligned in a different direction to handle the stress forces that the rotor blade experiences. In some embodiments, the number of layers is greater near the proximal end of the rotor blade to the blade cuff that attaches to a spindle of the rotor hub as that is where more forces are experienced by the portions of the blade. In 1730, the wrapped front edge section(s), front core section(s), and back core section(s) are placed in a mold. For example the rotor blade components are disposed in a mold to achieve the final shape of the rotor blade. In 1735, resin is injected into the mold. In some embodiments, the resin is also pulled into the mold by putting the interior of the mold under a vacuum. In some embodiments, the mold includes a top part and a bottom part and the two parts are mated together to create a cavity that resin can be injected into or drawn into by applying a vacuum. In 1740, the rotor blade is baked in the mold. For example, the fiber wrapped components which have been surrounded by resin are baked to harden and bind together the components of the rotor blade. In 1745, the rotor blade is removed from the mold. For example, the rotor blade formed from the cured resin surrounding the rotor blade components is removed from the mold. In 1750, the rotor blade's outer surface is finished. For example, any stray hardened resin that have been made attached to the rotor blade are remove or adjusted as part of the finished rotor blade. In 1755, the rotor blade is tested and/or inspected. For example, the blade is spun using a test rig that enables attaching the rotor blade to a rotor hub/spindle and the blade is spun up to 110% of its design speed.

Figure 18:
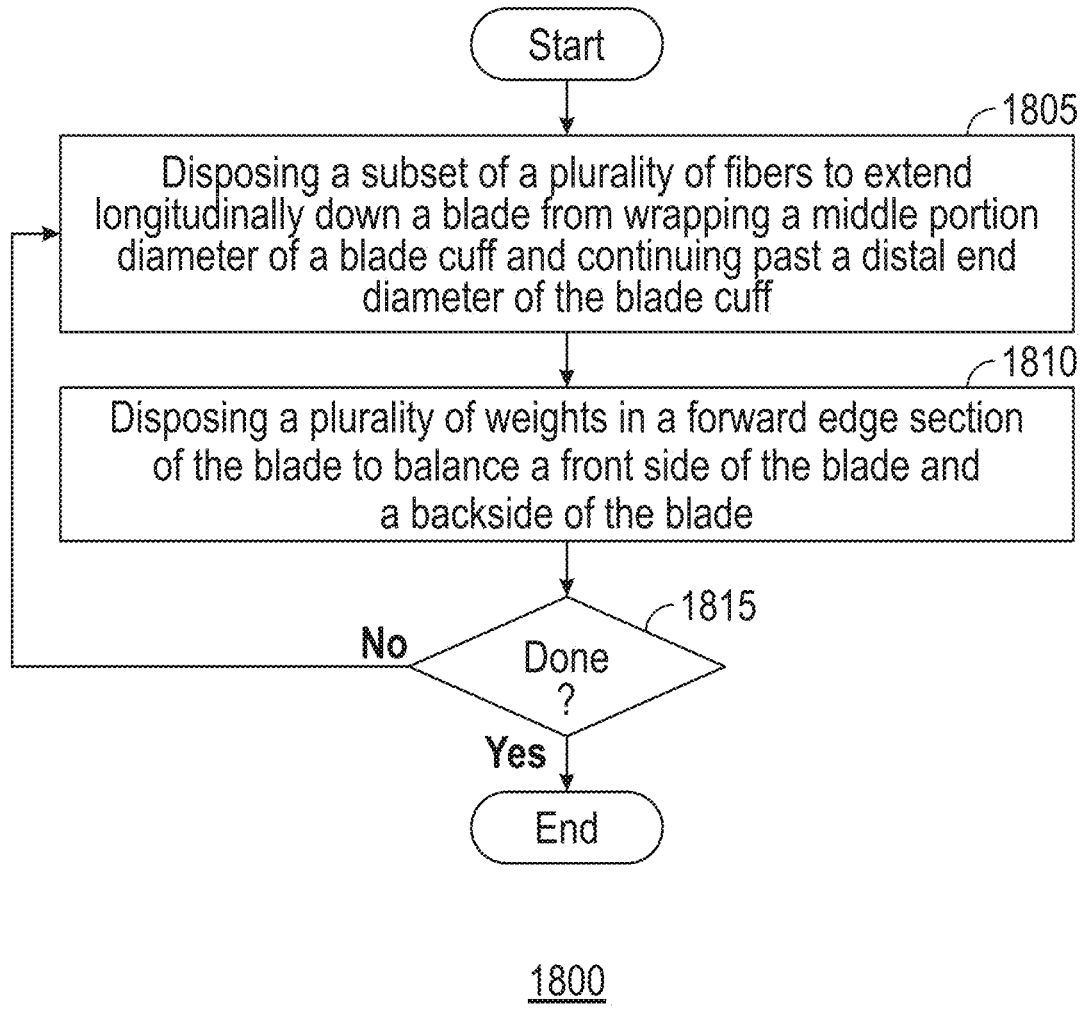
FIG. 18 is a flow diagram of a method for manufacturing a rotor blade according to various embodiments.

FIG. 18 is a flow diagram of a method for manufacturing a rotor blade according to various embodiments. In some embodiments, process 1800 is implemented in connection with manufacturing the rotor blade described herein.

At 1805, a subset of a plurality of fibers are disposed to extend longitudinally down a blade from wrapping a middle portion diameter of a blade cuff and continuing past a distal end diameter of the blade cuff. The distal end diameter of the blade cuff is larger in diameter than the middle portion diameter of the blade cuff. In some embodiments, the plurality of fibers are composed of fiberglass.

At 1810, a plurality of weights are disposed in a forward edge section of the blade to balance a front side of the blade and a backside of the blade. In some embodiments, 1810 is implemented before 1805.

At 1815, a determination is made as to whether process 1800 is complete. In some embodiments, process 1800 is determined to be complete in response to a determination that no fibers are to be laid up on the rotor blade, an operator indicates that process 1800 is to be paused or stopped, etc. In response to a determination that process 1800 is complete, process 1800 ends. In response to a determination that process 1800 is not complete, process 1800 returns to 1805.

Process 1800 may additionally comprise disposing the wrapped rotor blade into an injection mold and impregnating the rotor blade with resin which is cured (e.g., in a single step) in order to keep the profile of the rotor blade corresponding to a profile of the injection mold cavity in which the rotor blade was placed before resin impregnation.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the disclosed is not limited to the details provided. There are many alternative ways of implementing the disclosed. The disclosed embodiments are illustrative and not restrictive.

What is claimed is:

1. A rotor blade assembly for an aircraft, comprising:
a rotor blade; and
a blade cuff coupled to the rotor blade, the blade cuff comprising at least one ridge and at least one notch disposed on an interior surface of the blade cuff for coupling the blade cuff to a rotor hub;
wherein:
the at least one ridge extends radially inward from a blade cuff sleeve toward a center of the blade cuff and is radially positioned around the interior surface of the blade cuff sleeve;
the at least one notch is recessed into the blade cuff sleeve, away from the center of the blade cuff, and extends from the interior surface toward the blade cuff sleeve;
a distal end diameter of the blade cuff is larger in diameter than a middle portion diameter of the blade cuff;
the rotor blade is wrapped by a plurality of fibers;
at least a subset of the plurality of fibers extend longitudinally along the rotor blade toward the blade cuff, the plurality of fibers continuing past the distal end diameter of the blade cuff and wrapping around the middle portion diameter of the blade cuff; and the rotor blade comprises a plurality of weights disposed in a forward edge section of the rotor blade to balance a front side of the rotor blade and a backside of the rotor blade.

2. The rotor blade assembly of claim 1, wherein at least a subset of the plurality of weights are disposed within the forward edge section that positions the plurality of weights.

3. The rotor blade assembly of claim 2, wherein a plurality of tubes is disposed within the forward edge section, and the subset of the plurality of weights are disposed within the plurality of tubes.

4. The rotor blade assembly of claim 3, wherein the forward edge section comprises foam.

5. The rotor blade assembly of claim 2, wherein the forward edge section is bonded to a front core.

6. The rotor blade assembly of claim 5, wherein the forward edge section and the front core are wrapped with fibers to create a wrapped forward edge section and front core.

7. The rotor blade assembly of claim 6, wherein the wrapped forward edge section and front core are coupled to a back core.

8. The rotor blade assembly of claim 7, wherein the wrapped forward edge section and front core and the back core are wrapped with fibers to create a wrapped forward edge section, front core, and back core.

9. The rotor blade assembly of claim 8, wherein the wrapped forward edge section, front core, and back core are encapsulated within a resin.

10. The rotor blade assembly of claim 1, wherein the at least one ridge and the at least one notch are configured to align with corresponding gaps between ridges on an outer circumference of the rotor hub, and wherein rotation of the rotor blade assembly causes the at least one ridge and the at least one notch to engage the ridges to secure the rotor blade assembly to the rotor hub.

11. The rotor blade assembly of claim 10, wherein the engagement between the at least one ridge and the at least one notch of the blade cuff and the corresponding gaps and ridges of the rotor hub is configured to allow removal of the rotor blade assembly by rotating the blade cuff to realign the at least one ridge and the at least one notch with the gaps in the rotor hub.

12. The rotor blade assembly of claim 1, wherein the subset of the plurality of fibers comprises a first subset and a second subset, and wherein the first subset and the second subset end at different places on the rotor blade.

13. The rotor blade assembly of claim 1, wherein the rotor blade is not symmetrical along a first axis and the plurality of weights balance the rotor blade.

14. The rotor blade assembly of claim 1, wherein the blade cuff comprises titanium.

15. The rotor blade assembly of claim 1, wherein the blade cuff comprises a proximal end that is configured to couple to the rotor hub, and wherein the blade cuff comprises a distal end that is configured to couple to the rotor blade.

16. The rotor blade assembly of claim 1, wherein the plurality of weights comprises ten weights.

17. The rotor blade assembly of claim 1, wherein at least two weights of the plurality of weights have a different weight.

18. The rotor blade assembly of claim 1, wherein the plurality of weights comprise a set of stainless steel weights.

19. The rotor blade assembly of claim 1, wherein a number of the plurality of fibers laid up on the rotor blade gradually decreases when moving from the blade cuff to a distal end of the rotor blade.

20. A method, comprising:

wrapping a rotor blade with a plurality of fibers;

disposing at least a subset of the plurality of fibers to extend longitudinally along the rotor blade toward a blade cuff comprising at least one ridge and one notch for coupling to a rotor hub, wherein the at least one ridge extends radially inward from a blade cuff sleeve toward a center of the blade cuff and is radially positioned around an interior surface of the blade cuff sleeve and the at least one notch is recessed into the blade cuff sleeve, away from the center of the blade cuff, and extends from the interior surface toward the blade cuff sleeve, the plurality of fibers continuing past a distal end diameter of the blade cuff and wrapping a middle portion diameter of the blade cuff, wherein the distal end diameter of the blade cuff is larger in diameter than a middle portion diameter of the blade cuff; and disposing a plurality of weights in a forward edge section of the rotor blade to balance a front side of the rotor blade and a backside of the rotor blade.

\* \* \* \* \*